US011048399B2

(12) United States Patent
Lee et al.

(10) Patent No.: US 11,048,399 B2
(45) Date of Patent: Jun. 29, 2021

(54) ELECTRONIC DEVICE AND METHOD FOR RECOGNIZING STYLUS PEN

(71) Applicant: Samsung Electronics Co., Ltd., Gyeonggi-do (KR)

(72) Inventors: Joohoon Lee, Gyeonggi-do (KR); Byunghoon Kang, Gyeonggi-do (KR); Hyunsuk Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 18 days.

(21) Appl. No.: 16/535,776

(22) Filed: Aug. 8, 2019

(65) Prior Publication Data

US 2020/0050350 A1    Feb. 13, 2020

(30) Foreign Application Priority Data

Aug. 8, 2018   (KR) .......................... 10-2018-0092657

(51) Int. Cl.
*G06F 3/0484* (2013.01)
*G06F 3/0354* (2013.01)
*G06F 3/0488* (2013.01)

(52) U.S. Cl.
CPC ...... *G06F 3/04847* (2013.01); *G06F 3/03545* (2013.01); *G06F 3/04883* (2013.01)

(58) Field of Classification Search
CPC ............. G06F 3/04847; G06F 3/03545; G06F 3/04883
See application file for complete search history.

(56) References Cited

U.S. PATENT DOCUMENTS

| 8,154,525 | B2 | 4/2012 | Katsurahira | |
| 2001/0001430 | A1* | 5/2001 | Ely | ........................ G06F 1/1626 178/18.03 |
| 2014/0104188 | A1* | 4/2014 | Bakken | .................. G06F 3/044 345/173 |
| 2015/0091880 | A1* | 4/2015 | Lee | ..................... G06F 3/03545 345/179 |
| 2017/0024061 | A1* | 1/2017 | Forlines | .............. G06F 3/04166 |

FOREIGN PATENT DOCUMENTS

| JP | 5447341 | 3/2014 |
| KR | 101450164 | 10/2014 |

* cited by examiner

*Primary Examiner* — Seth A Silverman
(74) *Attorney, Agent, or Firm* — The Farrell Law Firm, P.C.

(57) ABSTRACT

Disclosed is an electronic device including a housing, a display panel which is viewable via a part of the housing, and is configured to detect an input by a stylus pen, a processor operatively connected to the display panel, and a memory operatively connected to the processor, wherein the memory is configured to store instructions which, when executed, enable the processor to receive a signal from the stylus pen via the display panel, determine a strength of the signal, a first phase of the signal, and a location of an input by the stylus pen based on at least the received signal, and adjust a threshold value used for determining a type of an input by the stylus pen based on at least the first phase.

18 Claims, 14 Drawing Sheets

ELECTRONIC DEVICE AND METHOD FOR RECOGNIZING STYLUS PEN

CROSS-REFERENCE TO RELATED APPLICATION(S)

This application is based on and claims priority under 35 U.S.C. § 119 to Korean Patent Application No. 10-2018-0092657, filed on Aug. 8, 2018, in the Korean Intellectual Property Office, the disclosure of which is incorporated by reference herein in its entirety.

BACKGROUND

1. Field

The disclosure relates generally to an electronic device, and more particularly, to an operation method of an electronic device that is used for recognizing the type of an input received from a stylus pen.

2. Description of Related Art

An electronic device including a touch screen has been developed in order to provide intuitive interaction. The electronic device may interoperate with an input tool, such as a digital pen or a stylus.

The resonant frequency of a signal received from the input tool may vary depending on numerous factors. Accordingly, different deviations in the resonant frequency of the input tools may be experienced when the electronic device interoperates with these input tools, thereby causing input problems to the user of the input tool when inputs are made on the device, As such, there is a need in the art for a method and apparatus that account for such deviations between the input tools, in order to provide an improved sense of input to the user of such input tools.

SUMMARY

Aspects of the disclosure are to address at least the above-mentioned problems and/or disadvantages and to provide at least the advantages described below. Accordingly, an aspect of the disclosure is to provide an electronic device that detects and corrects a deviation in resonant frequency which occurs due to the input tool, thereby processing a signal received from the input tool.

Another aspect of the disclosure is to provide an electronic device and an operation method therefor which may adaptively adjust a threshold value used for recognizing the type of an input received from an input tool, so as to enhance the sense of writing with the input tool.

In accordance with an aspect of the disclosure, there is provided an electronic device, including a housing, a display panel which is viewable via a part of the housing, and is configured to detect an input by a stylus pen, a processor operatively connected to the display panel, and a memory operatively connected to the processor, wherein the memory is configured to store instructions which, when executed, enable the processor to receive a signal from the stylus pen via the display panel, determine a strength of the signal, a first phase of the signal, and a location of an input by the stylus pen based on at least the received signal, and adjust a threshold value used for determining a type of an input by the stylus pen based on at least the first phase.

In accordance with another aspect of the disclosure, there is provided an electronic device including a display, a sensor circuitry, at least one memory storing instructions, and at least one processor operatively coupled to the display, the sensor circuitry, and the at least one memory, wherein, when executing the instructions, the at least one processor is configured to, obtain data associated with a relative location between the display and a stylus based on a signal received via the display from the stylus spaced apart from the display, identify that the data falls within a designated range, and adjust a threshold value for determining whether to recognize an input by the stylus as a touch input to the display or a hovering input to the display based on the signal, in response to the identifying.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
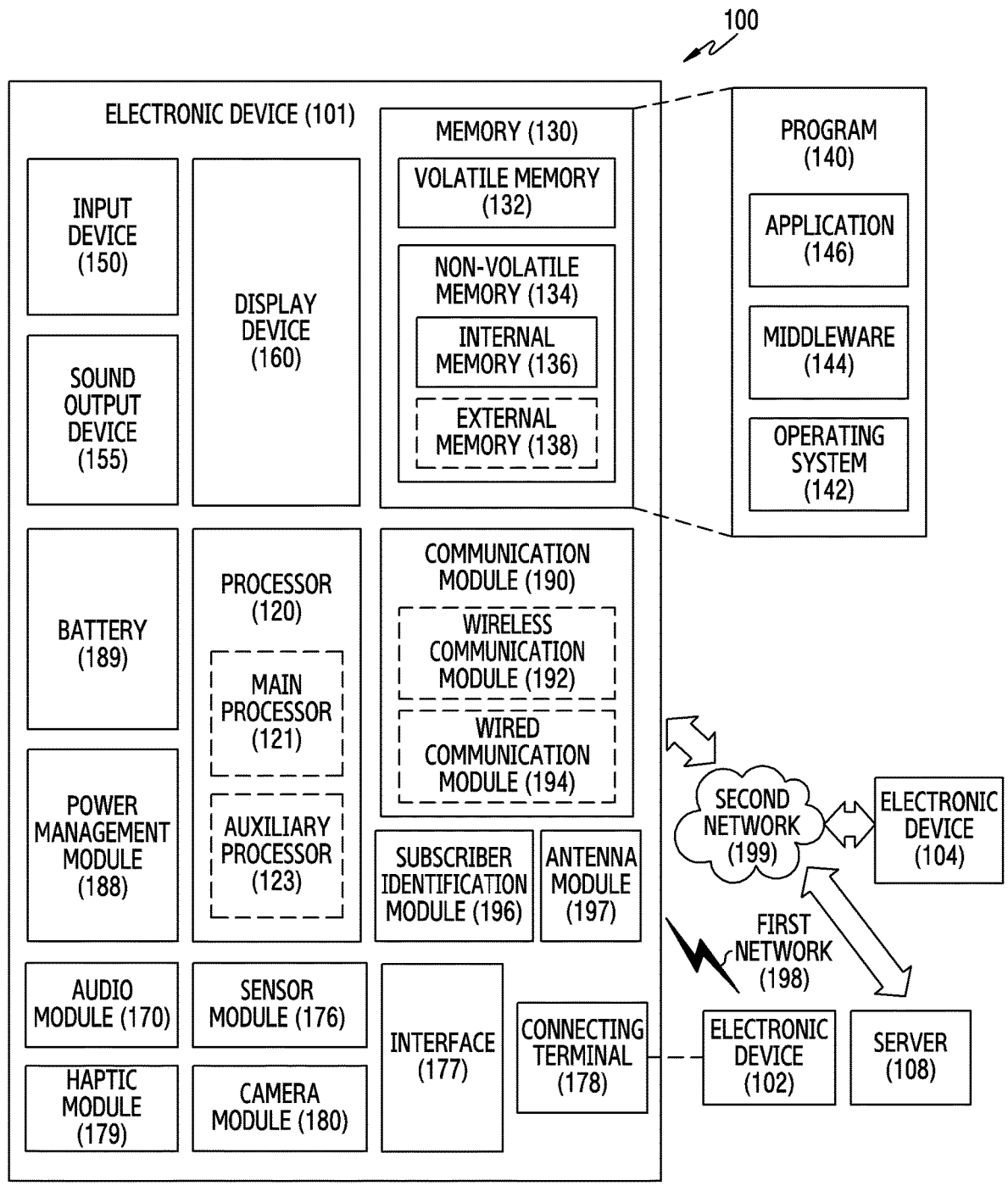
FIG. 1 illustrates an electronic device in a network environment according to an embodiment.

Hereinafter, embodiments of the disclosure will be described with reference to accompanying drawings, in which a size of each component may be exaggerated for convenience. Detailed descriptions of known functions and configurations incorporated herein will be omitted for the sake of clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to distinguish a corresponding component from another, and do not limit the components in other aspect, such as importance or order. It is to be understood that if an element, such as a first element, is referred to, with or without the term "operatively" or "communicatively", as "coupled with," "coupled to," "connected with," or "connected to" another element, such as a second element, it is indicated that the first element may be coupled with the other element directly, wirelessly, or via a third element.

FIG. 1 is a block diagram of an electronic device 101 in a network environment 100 according to an embodiment.

Referring to FIG. 1, the electronic device 101 in the network environment 100 may communicate with an electronic device 102 via a first network 198, such as a short-range wireless communication network, or an electronic device 104 or a server 108 via a second network 199, such as a long-range wireless communication network. The electronic device 101 may communicate with the electronic device 104 via the server 108 and may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160.

The processor 120 may execute, for example, software (e.g., a program 140) to control at least one hardware or software component of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121, such as a central processing unit (CPU) or an application processor (AP), and an auxiliary processor 123, such as a graphics processing unit (GPU), an image signal processor (ISP), a sensor hub processor, or a communication processor (CP) that is operable independently from, or in conjunction with, the main processor 121. Additionally or alternatively, the auxiliary processor 123 may be adapted to consume less power than the main processor 121, or to be specific to a specified function, and may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive state, or together with the main processor 121 while the main processor 121 is in an active state. The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component of the electronic device 101, from a user of the electronic device 101 and may include a microphone, a mouse, a keyboard, or a digital pen, such as a stylus pen.

The sound output device 155 may output sound signals to the outside of the electronic device 101. The sound output device 155 may include a speaker or a receiver. The speaker may be used for general purposes, such as playing multimedia or playing record, and the receiver may be used for an incoming calls and may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, may obtain the sound via the input device 150, or output the sound via the sound output device 155 or a headphone of an external electronic device 102 directly (e.g., wiredly) or wirelessly coupled with the electronic device 101.

The sensor module 176 may detect an operational state of the electronic device 101 or an environmental state external to the electronic device 101, and then generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102 and may include the HDMI connector, USB connector, SD card connector, or audio connector, such as a headphone connector.

The haptic module 179 may convert an electrical signal into a mechanical stimulus, such as a vibration or a movement or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101 and may be implemented as at least part of a power management integrated circuit (PMIC).

The battery 189 may supply power to at least one component of the electronic device 101 and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel, may include one or more communication processors that are operable independently from the processor 120 (e.g., the AP) and supports a direct (e.g., wired) communication or a wireless communication and may include a wireless communication module 192, such as a cellular communication module, a short-range wireless communication module, or a global navigation satellite system (GNSS) communication module, or a wired communication module 194, such as a local area network (LAN) communication module or a power line communication (PLC) module. A corresponding one of these communication modules may communicate with the external electronic device via the first network 198, such as a short-range communication network, such as Bluetooth™, wireless-fidelity (Wi-Fi) direct, or infrared data association (IrDA)) or the second network 199, such as a long-range communication network including a cellular network, the Internet, or a computer network, such as LAN or wide area network (WAN).

These various types of communication modules may be implemented as a single component, such as a single chip, or may be implemented as multi components, such as multi chips separate from each other. The wireless communication module 192 may identify and authenticate the electronic device 101 in a communication network, such as the first network 198 or the second network 199, using subscriber information, such as an international mobile subscriber identity (IMSI) stored in the subscriber identification module 196.

The antenna module 197 may transmit or receive a signal or power to or from the external electronic device of the electronic device 101, may include an antenna including a radiating element composed of a conductive material or a conductive pattern formed in or on a substrate, such as a printed circuit board (PCB), and may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component, such as a radio frequency integrated circuit (RFIC), other than the radiating element may be additionally formed as part of the antenna module 197.

At least some of the above-described components may be coupled mutually and communicate signals, such as commands or data therebetween via an inter-peripheral communication scheme, such as a bus, general purpose input and output (GPIO), serial peripheral interface (SPI), or mobile industry processor interface (MIPI).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

Figure 2:
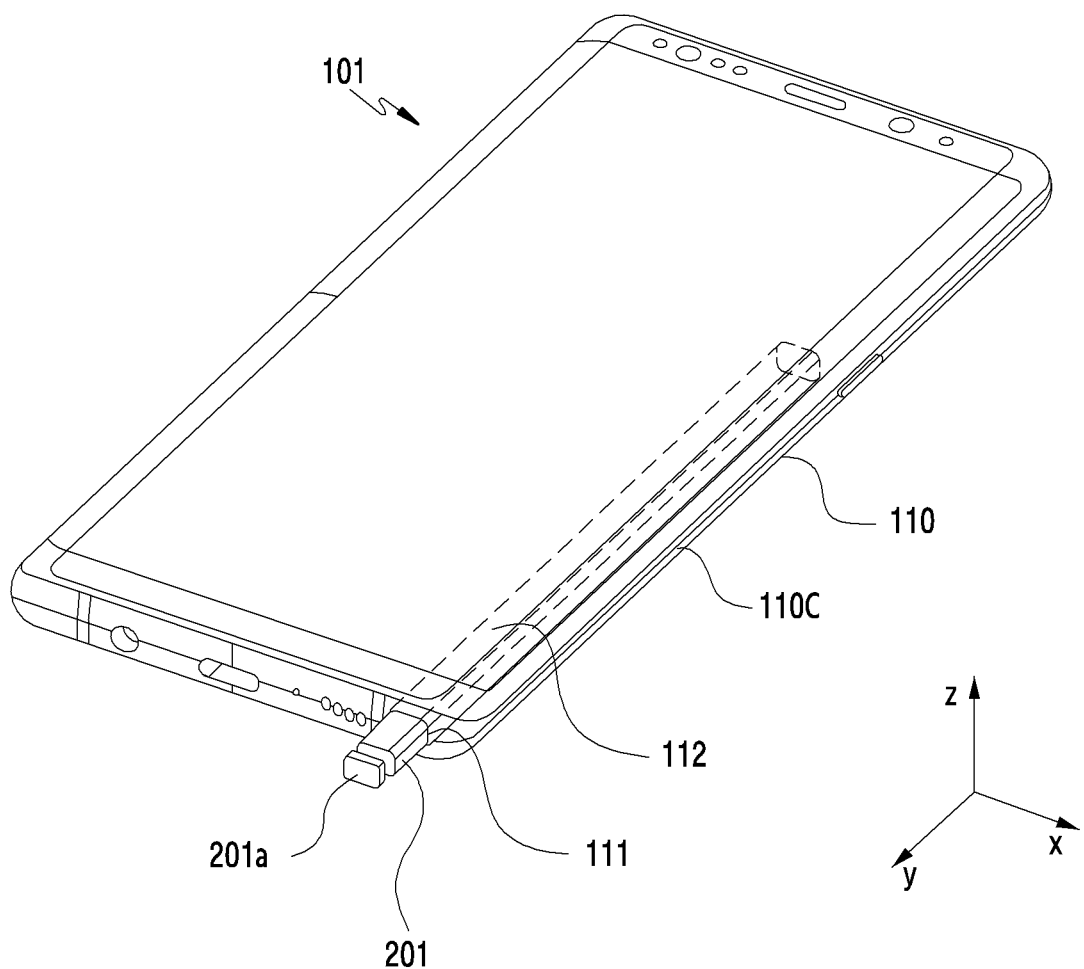
FIG. 2 is a perspective view of an electronic device including a digital pen according to an embodiment.

FIG. 2 is a perspective view of an electronic device including a digital pen according to an embodiment.

Referring to FIG. 2, the electronic device 101 may include the configuration of FIG. 1, and may include a structure into which the digital pen 201 (e.g., a stylus pen) is capable of being inserted. The electronic device 101 may include a housing 110, a hole 111 in a part of the housing, i.e., a part of a side 110C, a storage space 112 which is linked with the hole 111, and the digital pen 201 may be inserted into the storage space 112 and may include a pressable button 201a in one end, so that the digital pen 201 can be easily removed from the storage space 112 of the electronic device 101. When the button 201 is pressed, a repulsion mechanism (at least one spring) configured to interoperate with the button 201a operates, and the digital pen 201 may be detached from the storage space 112.

Figure 3:
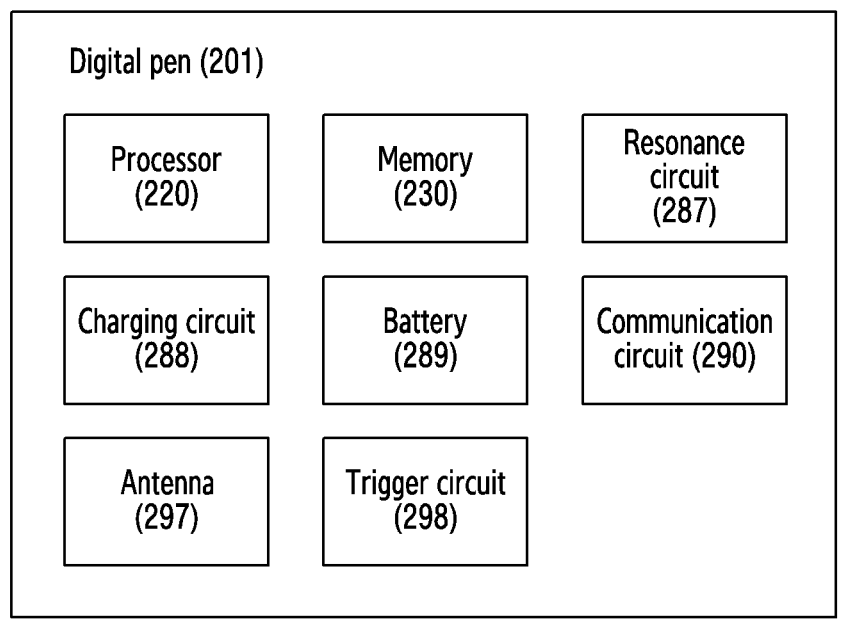
FIG. 3 illustrates a digital pen according to an embodiment.

FIG. 3 illustrates a digital pen according to an embodiment.

Referring to FIG. 3, the digital pen 201 may include a processor 220, a memory 230, a resonant circuit 287, a charging circuit 288, a battery 289, a communication circuit 290, an antenna 297, and/or a trigger circuit 298. In some embodiments, the processor 220 of the digital pen 201, at least a part of the resonant circuit 287, and/or at least a part of the communication circuit 290 may be configured on a printed circuit board or in the form of a chip. The processor 220, the resonant circuit 287, and/or the communication circuit 290 may be electrically connected to the memory 230, the charging circuit 288, the battery 289, the antenna 297, or the trigger circuit 298. The digital pen 201 may be configured to include only a resonant circuit and a button.

The processor 220 may include a generic processor which is configured to run a customized hardware module or software. The processor may include software elements (programs) or hardware elements (functions) including at least one from among various sensors included in the digital pen 201, a data management module, an input/output interface, a module for managing the state or environment of the digital pen 201, or a communication module. The processor 220 may include one or a combination of two or more from among hardware, software, and firmware, and may receive a proximity signal corresponding to an electromagnetic signal generated from the display device 160 of the electronic device 101 via the resonant circuit 287. When the proximity signal is identified, the resonant circuit 278 may be controlled such that an electro-magnetic resonance (EMR) input signal is transmitted to the electronic device 101.

The memory 230 may store information related to the operation of the digital pen 201, such as information for communication with the electronic device 101, and frequency information related to an input operation by the digital pen 201.

The resonant circuit 287 may include at least one of a coil, an inductor, or a capacitor, and may be used when the digital pen 201 generates a signal including a resonant frequency. For example, in order to generate the signal, the digital pen 201 may use at least one of an EMR scheme, an active electrostatic (AES) scheme, or an electrically coupled resonance (ECR). When the digital pen 201 transmits a signal according to the EMR scheme, the digital pen 201 may generate a signal including a resonant frequency based on an electromagnetic field generated from an inductive panel of the electronic device 101.

When the digital pen 201 transmits a signal according to the AES scheme, the digital pen 201 may generate a signal using capacity coupling with the electronic device 101, and may generate a signal including a resonant frequency based on an electric field generated from a capacitive device of an electronic device. The resonant circuit 287 may be used for changing the frequency or the intensity of an electromagnetic field depending on the operation state by a user, and may provide a frequency for recognizing a hovering input, a drawing input, a button input, or an erasing input.

When being connected with the resonant circuit 287 based on a switching circuit, the charging circuit 288 may rectify a resonant signal generated from the resonant circuit 287 into a direct current signal, and may provide the same to the battery 289. The digital pen 201 may identify whether the digital pen 201 is inserted in the electronic device 101 using the voltage level of a direct current signal sensed from the charging circuit 288.

The battery 289 may be configured to store power required for the operation of the digital pen 201 and may include a lithium-ion battery or a capacitor, and may be a rechargeable battery or a disposable battery. The battery 289 may be charged with power, such as a direct current signal, provided from the charging circuit 288.

The communication circuit 290 may be configured to perform a wireless communication function between the digital pen 201 and the communication module 190 of the electronic device 101, and may transmit state information and input information of the digital pen 201 to the electronic device 101 using a short-range communication scheme. For example, the communication circuit 290 may transmit, to the electronic device 101, direction information, such as motion sensor data of the digital pen 201 obtained via the trigger circuit 298, sound information input via a microphone, or the amount of charge remaining in the battery 289. For example, the short-range communication scheme may include at least one of Bluetooth™, Bluetooth low energy (BLE), or a wireless LAN.

The antenna 297 may be used for transmitting a signal or power to electronic device 101 or may be used for receiving a signal or power from the outside. The digital pen 201 may include a plurality of antennas 297, and may select at least one antenna 297 suitable for a communication scheme among the plurality of antennas 297. Via the at least one antenna 297, the communication circuit 290 may exchange a signal or power with an external electronic device.

The trigger circuit 298 may include at least one button or a sensor circuitry. The processor 220 may identify a scheme of inputting a button, such as a touch or a press, or the type of a button, such as an EMR button or a BLE button, of the digital pen 201. A sensor circuitry may generate an electric signal or a data value corresponding to the internal operation state or an external environment state of the digital pen 201. For example, the sensor circuitry may include at least one of a motion sensor, a sensor for sensing the amount of charge remaining in a battery, a pressure sensor, an optical sensor, a temperature sensor, an earth magnetic field sensor, and a biometric sensor. The trigger circuit 298 may transmit a trigger signal to the electronic device 101 using an input signal of a button or a signal by a sensor.

Figure 4:
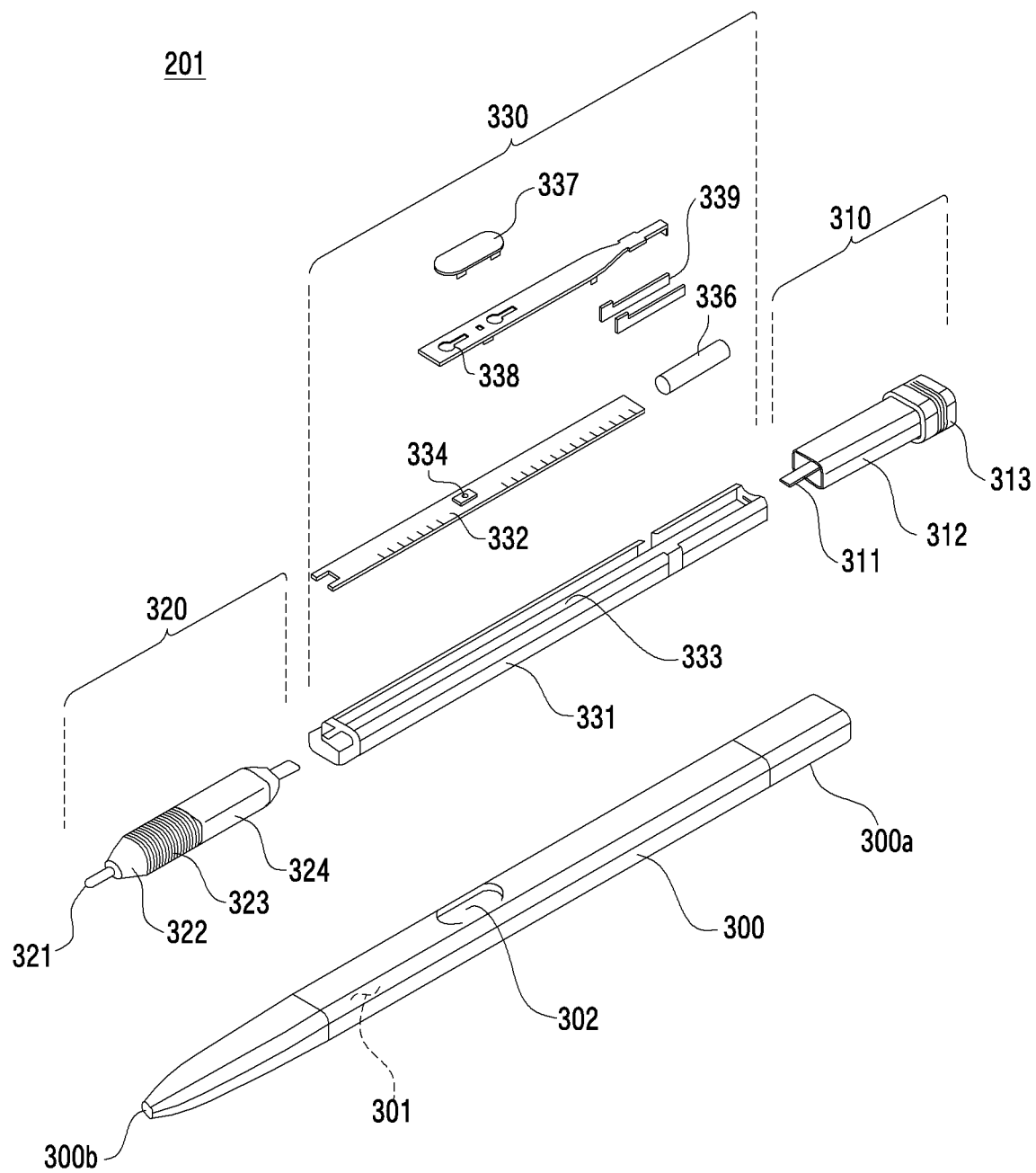
FIG. 4 is an exploded perspective view of a digital pen according to an embodiment.

FIG. 4 is an exploded perspective view of a digital pen according to an embodiment.

Referring to FIG. 4, the digital pen 201 may include a pen housing 300 forming the appearance of the digital pen 201, and an inner assembly inside the pen housing 300. The inner assembly may include various components contained inside a pen, and may be inserted into the pen housing 300 via a single assembly operation.

The pen housing 300 may be provided in a shape extended long between a first end 300a and a second end 300b, and may include the storage space 112 inside the housing 300. The pen housing 300 may be provided in a shape of which the sectional view is an oval including a major axis and a minor axis, and the overall shape is provided as a cylindroid. The storage space 112 of the electronic device 101 may be provided in a shape of which the sectional view is an oval in accordance with the shape of the pen housing 300. The pen housing 300 may include synthetic resins, such as plastic, and/or metallic materials, such as aluminum. The second end 300b of the pen housing 300 may be made of synthetic resins.

The inner assembly may be provided in a shape extended long to correspond to the shape of the pen housing 300, and may be divided briefly into three configurations along the longitudinal direction. For example, the inner assembly may include an ejection member 310 disposed in a location corresponding to the first end 300a, a coil part 320 disposed in a location corresponding to the second end 300b of the pen housing 300, and a circuit board part 330 disposed in a location corresponding to the body of the housing.

The ejection member 310 may include a configuration for removing the digital pen 201 from the storage space 112 of the electronic device 101, and may include a shaft 311, an ejection body 312 that is dispose around the shaft 311 and forms the appearance of the ejection member 310, and a button part 313. When the inner assembly is completely inserted into the pen housing 300, the part including the shaft 311 and the ejection body 312 may be enclosed by the first end 300a of the pen housing 300, and the button part 313 may be exposed to the outside of the first end 300a. A plurality of components which are not illustrated, i.e., cam members or elastic members, are disposed inside the ejection body 312, and may configure a push-pull structure. The button part 313 may be substantially coupled with the shaft 311, may perform a to-and-fro motion with respect to the ejection body 312, and may include a button in which a shoulder construction is formed, so that a user can remove the digital pen 201 using a fingernail. The digital pen 201 may include a sensor for detecting a straight-line motion of the shaft 311, and may provide another input scheme.

When the inner assembly is completely inserted into the pen housing 300, the coil part 320 may include a pen tip 321 which is exposed to the outside the second end 300b, a packing ring 322, a coil 323 winded multiple times, and/or a pen pressure sensing part 324 for obtaining a change in pressure according to a pressure provided by the pen tip 321. The packing ring 322 may include epoxy, rubber, urethane, or silicone. The packing ring 322 may be used for protection against water and dust, and may protect the coil part 320 and the circuit board part 330 from water or dust. The coil 323 may form a resonant frequency at a predetermined frequency band, such as 500 kHz, and may be coupled with at least one device, such as a capacitor, so as to adjust the resonant frequency formed by the coil 323 within a predetermined range.

The circuit board part 330 may include a PCB 332, a base 331 that encloses at least a part of the PCB 332, and an antenna. A board seating part 333 in which the PCB 332 is disposed is formed in the front side of the base 331, and the PCB 332 may be fixed when the PCB 332 is seated in the board seating part 333. The PCB 332 may include the front side and the rear side. A variable capacity capacitor or a switch 334 connected to the coil 323 may be disposed in the front side. A charging circuit, a battery, or a communication circuit may be disposed in the rear side. The battery may include an electric double layered capacitor (EDLC). The charging circuit may be disposed between the coil 323 and the battery, and may include a voltage detector circuit and a rectifier.

The antenna may include an antenna structure 339 and/or an antenna embedded in the PCB 332, as illustrated in FIG. 4. The switch 334 may be installed in the PCB 332. A side button 337 installed in the digital pen 201 may be used for pressing the switch 334, and may be exposed to the outside via a lateral opening part 302 of the pen housing 300. The side button 337 may be supported by a supporting member 338. When no external force is applied to the side button 337, the supporting member 338 provides an elastic restoring force so that the state in which the side button 337 is disposed in a predetermined location is restored or maintained.

The circuit board part 330 may include another packet ring, such as an O-ring. For example, O-rings made of an elastic body are disposed in both ends of the base 331 so that a sealed structure may be formed between the base 331 and the pen housing 300. The supporting member 338 may closely adhere to the inner wall of the pen housing 300 partially around the lateral opening part 302, and may form the sealed structure. For example, the circuit board part 330 may form a structure for protection against water and dust, which is similar to that of the packing ring 322 of the coil part 320.

The digital pen 201 may include a battery seating part 335 in which a battery 336 is disposed, in the front side of the base 331. The battery 336 that may be mounted in the battery seating part 335 may include a battery of a cylinder type.

The digital pen 201 may include a microphone that may be directly connected with the PCB 332, or may be connected to a separate flexible printed circuit board (FPCB) separately connected with the PCB 332. The micro phone may be disposed in a location which is parallel with the side button 337, in the longitudinal direction of the digital pen 201.

The electronic device may be one of various types of electronic devices. The electronic devices may include a portable communication device, such as a smartphone, a computer device, a portable multimedia device, a portable medical device, a camera, a wearable device, or a home appliance. However, the electronic devices are not limited to those described above.

Figure 5:
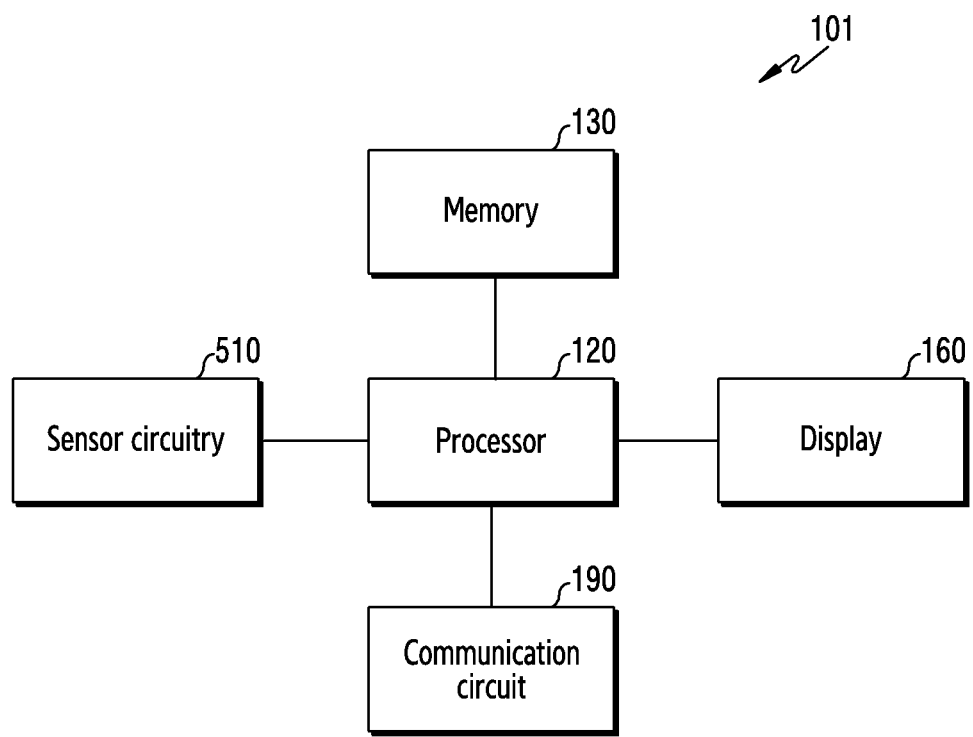
FIG. 5 illustrates an example of the functional configuration of an electronic device according to an embodiment.

FIG. 5 illustrates an example of the functional configuration of an electronic device according to an embodiment. Referring to FIG. 5, the electronic device 101 may include the processor 120, the memory 130, the display 160, the communication circuit 190, and/or a sensor circuitry 510.

The sensor circuitry 510 may be configured to receive an input from the digital pen 201 of FIG. 3 or FIG. 4, based on the control of the processor 120, may be referred to as an electromagnetic resonance (EMR) circuit, an EMR panel, or a digitizer, and may be disposed below the display 160. The digital pen 201 may be referred to as an input tool or an input device, as the digital pens 201 causes an input in the electronic device 101. The digital pen 210 may be referred to as a stylus in terms of being provided in the shape of a pen.

The processor 120 may receive a signal from the digital pen 201 located over the display 160. For example, the processor 120 may receive, using the sensor circuitry 510, a signal from the digital pen 201 which is spaced apart from the display 160. The signal may be an electromagnetic signal that is caused in the digital pen 201, due to an electromagnetic signal transmitted from the electronic device 101 via the sensor circuitry 510.

Figure 6:
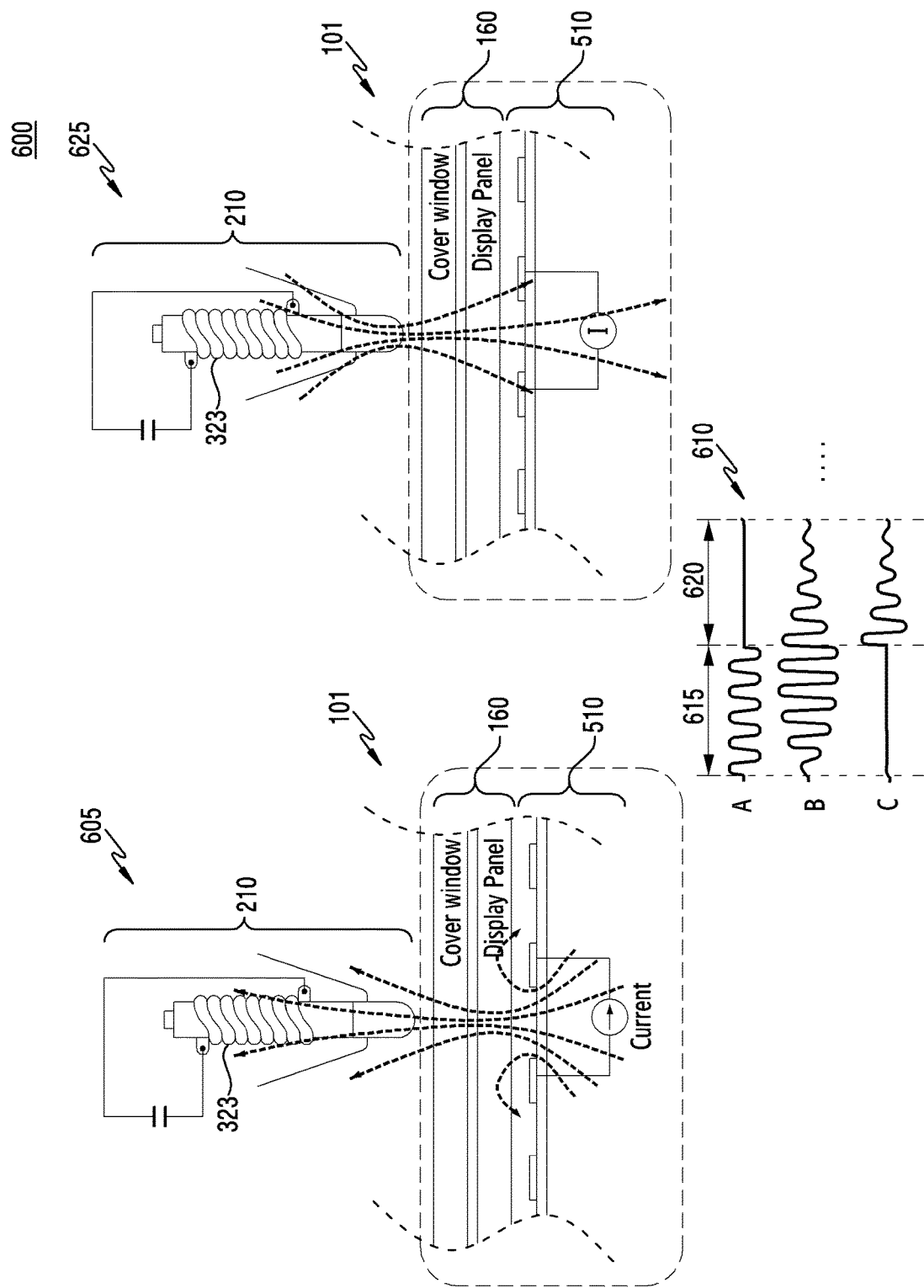
FIG. 6 illustrates an example in which an electronic device receives a signal from a digital pen using a sensor circuitry according to an embodiment.

FIG. 6 illustrates an example 600 in which an electronic device receives a signal from a digital pen using a sensor circuitry according to an embodiment.

For example, referring to FIG. 6, the processor 120 provides a current (or power) to the sensor circuitry 510, so as to emit or transmit a first electromagnetic signal via the sensor circuitry 510, as shown in a state 605. The processor 120 may emit or transmit the first electromagnetic signal during a first time interval 615, as shown in state A of graph 610, such as the state of an electromagnetic signal transmitted from the sensor circuitry 510. The first electromagnetic signal may be transmitted or transferred to the digital pen 210 which is spaced apart from the display 160, via the display 160, as shown in state 605, may cause a first resonance in the coil 323 of the digital pen 210, and may cause a second electromagnetic signal which is distinct from the first electromagnetic signal. The second electromagnetic signal may be caused during a second time interval 620 subsequent to the first time interval 615, as illustrated in state B of graph 610, such as the state of an electromagnetic signal in the digital pen 210.

During the second time interval 620, the processor 120 may block or restrict provision of a current to the sensor circuitry 510. While provision of a current to the sensor circuitry 510 is restricted during the second time interval 620, the second electromagnetic signal may be transmitted or transferred to the sensor circuitry 510 via the display 160. As illustrated in state 625, the second electromagnetic signal transmitted to the sensor circuitry 510 may cause a second resonance during the second time interval 620. The second resonance may cause a third electromagnetic signal distinct from the first electromagnetic signal and the second electromagnetic signal during the second time interval 620, as illustrated in state C of graph 610, such as the state of an electromagnetic signal measured in the sensor circuitry 510.

The processor 120 may obtain information associated with the third electromagnetic signal using the sensor circuitry 510, as illustrated in state 625, by measuring a current that is induced by the second resonance, and obtaining at least one of information associated with the frequency of the third electromagnetic signal or information associated with the phase of the third electromagnetic signal, as information associated with the third electromagnetic signal, as illustrated in state 625.

The processor 120 may identify the type of an input received from the digital pen 210, using the information associated with the third electromagnetic signal. For example, the processor 120 may compare the information associated with the third electromagnetic signal and reference information, so as to identify whether the input corresponds to a touch input or a hovering input. For example, based on identifying that the frequency of the third electromagnetic signal is less than or equal to a threshold value, the processor 120 may identify that the input corresponds to a touch input. As another example, the processor 120 may identify that the input corresponds to a hovering input based on identifying that the frequency of the third electromagnetic signal is greater than the threshold value. The threshold value may be referred to as a reference frequency, since the threshold value is used as a criterion for identifying the type of the input.

As another example, the processor 120 may identify that the input corresponds to a touch input based on identifying that the phase of the third electromagnetic signal is less than or equal to a threshold value. The phase of the third electromagnetic signal may be obtained by analyzing a change in the frequency of the third electromagnetic signal. The electronic device 101 may use the phase of the third electromagnetic signal, instead of the frequency of the third electromagnetic signal, in order to determine the type of the input at a quick response speed. As another example, the processor 120 may identify that the input corresponds to a hovering input based on identification that the phase of the third electromagnetic signal is greater than the threshold value. The threshold value may be referred to as a reference phase since the threshold value is used as a criterion for identifying the type of the input. However, the disclosure is not limited thereto.

The processor 120 may adaptively change the threshold value based on the third electromagnetic signal. For example, when the threshold value is set to a fixed value in the electronic device 101, the processor 120 may misrecognize the type of the input according to at least one of a change of the environment around the electronic device 101 (e.g., the temperature), a feature of the electronic device 101, and the device type of the digital pen 210. For example, when the threshold value is set to a fixed value, the processor 120 may misrecognize an input as a touch input although the input is caused when the digital pen 210 is spaced apart from the display 160, or may misrecognize an input as a hovering input although the input is caused when the digital pen 210 is in physical contact with the display 160. The processor 120 of the electronic device 101 may adaptively adjust the threshold value using at least one value obtained based on the third electromagnetic signal, such as the frequency of the third electromagnetic signal, the phase of the third electromagnetic signal, or the like, in order to prevent misrecognition.

The processor 120 may adaptively change the threshold value using the third electromagnetic signal based on identifying that the digital pen 210 is in a designated state.

The designated state may indicate that data associated with the relative location between the digital pen 210 and the display 160 falls within a designated range. For example, the data associated with the relative location may include data associated with the distance between the digital pen 210 and the display 160. Based on the strength of the third electromagnetic signal, the processor 120 may identify that the digital pen 210 causes the second electromagnetic signal when the digital pen 210 is a designated distance spaced apart from the display 160. The processor 120 may identify that the state of the digital pen 210 is in the designated state, based on the identification. The processor 120 may adaptively change the threshold value using the third electromagnetic signal based on the identification.

As another example, the data associated with the relative location may include data associated with coordinates of a display area of the display 160 at which the tip 321 of the digital pen 210 located over the display 160 is aiming. For example, the processor 120 may identify at least one channel that receives the third electromagnetic signal at the maximum reception strength from among a plurality of channels included in the sensor circuitry 510, and may identify the coordinates corresponding to the at least one channel. The processor 120 may identify that the state of the digital pen 210 is in the designated state, based on identifying that the coordinates are included in the at least one coordinates, and may adaptively change the threshold value using the third electromagnetic signal based on the identification.

The designated state may indicate that data associated with the posture of the digital pen 210 relative to the display 160 falls within another designated range which is distinct from the designated range. For example, the data associated with the posture of the digital pen 210 may include data associated with the angle between the digital pen 210 and the display 160. The processor 120 may obtain information associated with the angle between the digital pen 210 and the display 160, based on the pattern (or distribution) of data associated with the third electromagnetic signal (the strength of the third electromagnetic signal, the frequency of the third electromagnetic signal, the phase of the third electromagnetic signal or the like) at the at least one channel that receives the third electromagnetic signal at the maximum reception strength from among the plurality of channels, and the pattern (or distribution) of data associated with the third electromagnetic signal (the strength of the third electromagnetic signal, the frequency of the third electromagnetic signal, the phase of the third electromagnetic signal or the like) at other channels adjacent to the at least one channel. The processor 120 may identify that the state of the digital pen 210 is in the designated state, based on identifying that the angle corresponds to a designated angle, and may adaptively change the threshold value using the third electromagnetic signal based on the identification.

For example, as shown in Table 1 below, the processor 120 may adjust a threshold value, and may apply a different threshold value for each digital pen.

TABLE 1

|  | First digital pen | Second digital pen | ... |
|---|---|---|---|
| Adjusted threshold value (phase) | 450 | 420 | ... |
| Hovering input | $p_1 > 450$ | $p_3 > 420$ | ... |
| Touch input | $p_2 \leq 450$ | $P_4 \leq 420$ | ... |

As shown in Table 1, when the phase ($p_1$) of a first input received from a first digital pen is greater than an adjusted threshold value 450, the processor 120 may recognize the first input as a hovering input. When the phase ($p_2$) of a second input received from the first digital pen is less than or equal to the adjusted threshold value 450, the processor 120 may recognize the second input as a touch input. When the phase ($p_3$) of a third input received from a second digital pen distinct from the first digital pen is greater than an adjusted threshold value 420, the processor 120 may recognize the third input as a hovering input. When the phase ($p_4$) of a fourth input received from the second digital pen is less than or equal to the adjusted threshold value 420, the processor 120 may recognize the fourth input as a touch input.

As another example, as shown in Table 2 below, a threshold value may be adjusted and may be configured to be different for each electronic device.

TABLE 2

|  | Electronic device 101 | Electronic device 102 | ... |
|---|---|---|---|
| Adjusted threshold value (phase) | 460 | 430 | ... |
| Hovering input | $p_5 > 460$ | $p_7 > 430$ | ... |
| Touch input | $p_6 \leq 460$ | $p_8 \leq 430$ | ... |

As shown in Table 2, the processor 120 of the electronic device 101 according to various embodiments may adjust, to 460, the threshold value used for identifying or recognizing the type of an input received from the first digital pen, and a processor of another electronic device 102 distinct from the electronic device 101 may adjust, to 430, the threshold value used for identifying and recognizing the type of an input received from the first digital pen. When the phase ($p_5$) of a fifth input received from the first digital pen is greater than the adjusted threshold value 460, the processor 120 of the electronic device 101 may recognize the fifth input as a hovering input. When the phase ($p_6$) of a sixth input received from the first digital pen is less than or equal to the adjusted threshold value 460, the processor 120 of the electronic device 101 may recognize the sixth input as a touch input When the phase ($p_7$) of a seventh input received from the first digital pen is greater than the adjusted threshold value 430, the processor of the electronic device 102 may recognize the seventh input as a hovering input. When the phase ($p_8$) of an eighth input received from the first digital pen is less than or equal to the adjusted threshold value 430, the processor of the electronic device 102 may recognize the eighth input as a touch input.

The processor 120 may adjust the threshold value based on at least one value obtained based on the third electromagnetic signal. The at least one value obtained based on the third electromagnetic signal may include at least one of the frequency of the third electromagnetic signal, the phase of the third electromagnetic signal, or the strength of the third electromagnetic signal.

The processor 120 may adjust the threshold value using the third electromagnetic signal via various methods. For example, the processor 120 may apply at least one value obtained based on the third electromagnetic signal to another threshold value which has been previously configured in the electronic device 101 or which has been previously adjusted in the electronic device 101, thereby adjusting the other threshold value to be the threshold value. As another example, the processor 120 may adjust the threshold value based on statistical data obtained before the third electromagnetic signal is received, and the at least one value obtained based on the third electromagnetic signal. The statistical data may indicate data associated with threshold values which have been adjusted based on an electromagnetic signal that was obtained from the digital pen 210 in the designated state before the third electromagnetic signal is received. For example, the data associated with the threshold values may indicate data associated with at least one of the average of the threshold values, the minimum value of the threshold values, or a trend of a change of the threshold values. However, the disclosure is not limited thereto.

The processor 120 may differently adjust the threshold value for each coordinates of a display area of the display 160. For example, the at least one value obtained based on the third electromagnetic signal may be distorted by other components included in the electronic device 101, such as the sound output device 155, the camera module 180, and the like. As another example, the at least one value obtained based on the third electromagnetic signal may be distorted, due to the positional feature of each coordinates in the display area of the display 160 of the electronic device 101. The processor 120 may differently adjust the threshold value for each coordinates of the display area of the display 160, in consideration of the distortion. For example, the processor 120 may adjust the threshold value to a first threshold value in order to identify the type of an input received via at least one channel used for receiving the third electromagnetic signal from among the plurality of channels included in the sensor circuitry 510 from the digital pen 210, and may adjust the threshold value to a second threshold value distinct from the first threshold value in order to identify the type of an input received from the digital pen 210 via at least some of the channels remaining after excluding the at least one channel from the plurality of channels. However, the disclosure is not limited thereto.

The processor 120 may use data distinct for each digital pen 210, in order to adjust the threshold value. The data may be stored in advance in the memory 130 of the electronic device 101 and may be expressed as shown in Table 3 below.

TABLE 3

|  | Type of digital pen | | | |
|---|---|---|---|---|
|  | First digital pen | Second digital pen | Third digital pen | ... |
| Identifier of digital pen | $ID_1$ | $ID_2$ | $ID_3$ | ... |
| Adjusted threshold value | A | B | C | ... |

As shown in Table 3, the data may include adjusted threshold value A which is mapped to an identifier ($ID_1$), such as a medium access control (MAC) identifier or a MAC address used for identifying a first digital pen, may include adjusted threshold value B which is mapped to an identifier ($ID_2$) for identifying a second digital pen distinct from the first digital pen, and may include adjusted threshold value C which is mapped to an identifier ($ID_3$) for identifying a third digital pen distinct from the first digital pen and the second digital pen.

The processor 120 may receive a signal from a digital pen using the communication circuit 190, and may obtain an identifier of the digital pen from the received signal. The processor 120 may search for an identifier corresponding to the identifier from the data configured as shown in Table 3, and may identify or recognize the type of an input received from the digital pen using the adjusted threshold value mapped to the retrieved identifier. When the electronic device 101 configures data as shown in Table 3, if the threshold value is adjusted or changed, the processor 120 may update the changed threshold value in the data. For example, when the adjusted threshold value is adjusted in Table 3, the processor 120 may adjust the adjusted threshold value from A to AA, may map the threshold value which is adjusted to AA to an identifier $ID_1$ of the digital pen, and may store the same in the data. However, the disclosure is not limited thereto.

The processor 120 may transmit information associated with the adjusted threshold value to the digital pen 210 using the communication circuit 190. The information associated with the transmitted threshold value may be stored in the digital pen 210. The digital pen 210 that stores the information associated with the threshold value may transmit the information associated with the threshold value to the electronic device 101, when interoperating with the electronic device 101. The processor 120 may recognize the type of an input received from the digital pen 210 using the information associated with the received threshold value. However, the disclosure is not limited thereto.

Figure 7:
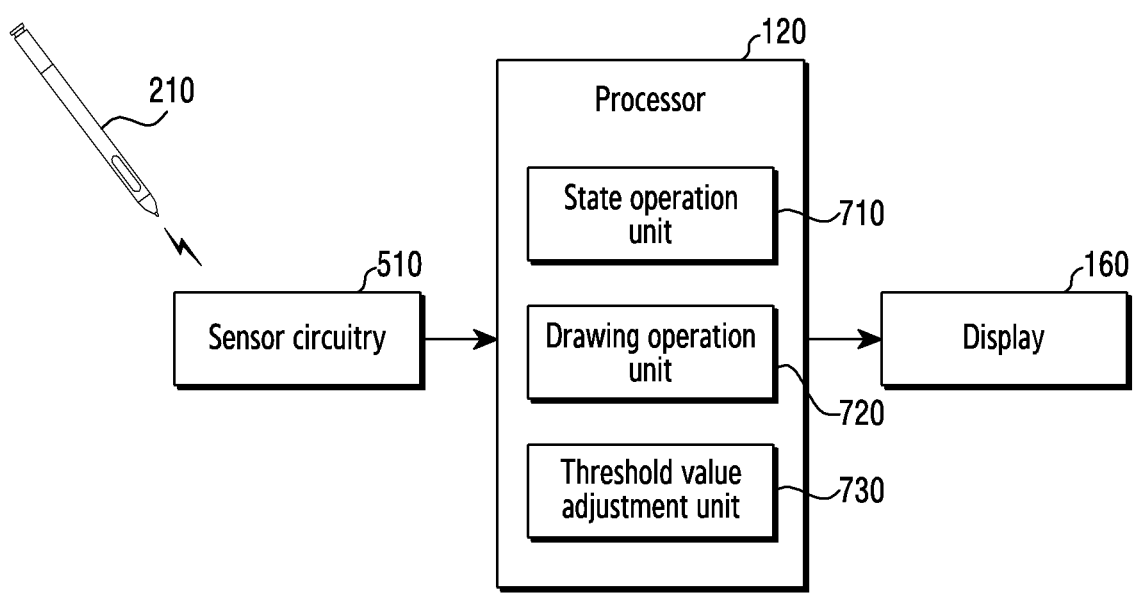
FIG. 7 illustrates an example of modules configured or defined in a processor of an electronic device according to an embodiment.

FIG. 7 illustrates an example 700 of modules configured or defined in a processor of an electronic device according to an embodiment.

The processor 120 may adjust the threshold value using various modules. For example, referring to FIG. 7, the processor 120 may receive the third electromagnetic signal from the digital pen 210 via the sensor circuitry 510, and may identify whether the digital pen 210 is in a designated state based on the third electromagnetic signal, using the state operation unit 710. For example, the processor 120 may obtain, using the state operation unit 710, information associated with at least one from among a vertical relation of position between the digital pen 210 and the display 160, such as the distance between the digital pen 210 and the display 160, a horizontal relation of position between the digital pen 210 and the display 160, such as coordinates of a point at which a line extended from the tip of the digital pen 210 spaced apart from the display 160 is in contact with the display 160, or the angle between the digital pen 210 and the display 160, such as the angle between a line extended from the tip of the digital pen 210 spaced apart from the display 160 and any line included in the display 160, based on at least one of the strength of reception of the third electromagnetic signal, the distribution of strength of the third electromagnetic signal in the sensor circuitry 510, the phase of the third electromagnetic signal, or the frequency of the third electromagnetic signal.

The processor 120 may identify whether the digital pen 210 is in the designated state based on the obtained information, using the state operation unit 710, and may determine whether to adjust the threshold value for identifying or recognizing the type of an input received from the digital pen 210 using a threshold value adjustment unit 730 based on identifying that the digital pen 210 is in the designated state. For example, the processor 120 may determine to adjust the threshold value based on at least one of the strength of reception of the third electromagnetic signal, the distribution of the strength of the third electromagnetic signal in the sensor circuitry 510, the phase of the third electromagnetic signal, and the frequency of the third electromagnetic signal, and may adjust the threshold value based on the strength of reception of the third electromagnetic signal, the distribution of strength of the third electromagnetic signal in the sensor circuitry 510, the phase of the third electromagnetic signal, or the frequency of the third electromagnetic signal, using the threshold value adjustment unit 730.

As another example, the processor 120 may determine to maintain the threshold value based on at least one of the strength of reception of the third electromagnetic signal, the distribution of strength of the third electromagnetic signal, the phase of the third electromagnetic signal, and the frequency of the third electromagnetic signal, using the threshold value adjustment unit 730.

The processor 120 may recognize the type of the input received from the digital pen 210 based on the maintained or adjusted threshold value, and may process the input using a drawing operation unit 720 based on the recognize type. For example, while displaying a screen using the display 160, the processor 120 may recognize that an input received from the digital pen 210 is a touch input, using the threshold value, and may change representation of the screen based on the recognition. As another example, while displaying a screen using the display 160, the processor 120 may recognize that an input received from the digital pen 210 is a touch input with a pressure, using the threshold value, and may change representation of the screen based on the recognition. As another example, while displaying a screen using the display 160, the processor 120 may recognize that an input received from the digital pen 210 is a hovering input, using the threshold value, and may change representation of the screen based on the recognition. However, the disclosure is not limited thereto.

As described above, the electronic device 101 may adaptively adjust a threshold value so as to identify the type of an input caused by an electromagnetic signal, based on the electromagnetic signal received from the digital pen 210 spaced apart from the display 160. Via the adjustment, the electronic device 101 may provide an improved sense of writing to a user who uses the digital pen 210 with respect to the electronic device 101.

According to an embodiment, an electronic device includes a housing, a display panel which is viewable via a part of the housing, and is configured to detect an input by a stylus pen, a processor operatively connected to the display panel, and a memory operatively connected to the processor, wherein the memory may store instructions, and when executed, the instructions enable the processor to receive a signal from the stylus pen via the display panel; determine a strength of the signal, a first phase of the signal, and a location of an input by the stylus pen based on at least the received signal; and adjust a threshold value used for determining a type of an input by the stylus pen based on at least the first phase.

The memory may be configured to store a second phase, and the instructions may enable the processor to compare the first phase and the second phase; and adjust the threshold value based on at least a result of the comparison. The instructions may enable the processor to adjust the threshold value based on at least a difference between the first phase and the second phase. The threshold value may include a phase value of a signal to be used for distinguishing a touch input and a hovering input by the stylus pen.

The threshold value may include frequency values of a signal to be used for distinguishing a touch input and a hovering input by the stylus pen.

The instructions may enable the processor to receive the signal from the stylus pen in a state in which the stylus pen is not in contact with the display.

The electronic device may further include a hole, capable of receiving the stylus pen, in the housing.

According to an embodiment, an electronic device includes a display, sensor circuitry, at least one memory storing instructions, and at least one processor operatively coupled to the display, the sensor circuitry, and the at least one memory, wherein, when executing the instructions, the at least one processor may be configured to obtain data associated with a relative location between the display and a stylus based on a signal received via the display from the stylus spaced apart from the display identify that the data falls within a designated range, and adjust a threshold value for determining whether to recognize an input by the stylus as a touch input to the display or a hovering input to the display based on the signal, in response to the identification.

When executing the instructions, the at least one processor may be further configured to obtain another data associated with a posture of the stylus relative to the display based on the signal, and adjust the threshold value based on the signal in response to identifying that the data falls within the designated range, and the other data falls within another designated range. The data may include a value indicating a distance between the display and the stylus, and a value indicating a location where the signal is received, and the other data may include a value indicating an angle between the stylus and the display.

When executing the instructions, the at least one processor may be further configured to receive an input from the stylus; recognize the received input as a hovering input and provide a function corresponding to the hovering input based on identifying that a value obtained based on the received input is greater than or equal to the adjusted threshold value; and recognize the received input as a touch input and provide a function corresponding to the touch input based on identifying that a value obtained based on the received input is less than the adjusted threshold value. The value obtained based on the received input may include a value indicating a phase of a signal caused in the sensor circuitry due to the input.

The sensor circuitry may include a plurality of channels, and when executing the instructions, the at least one processor may be configured to determine a distance between the display and a tip of the stylus and a location where the signal is received, based on a strength of the signal received from the stylus via each of at least one channel among the plurality of channels, so as to obtain the data associated with the relative location. The threshold value may be used for a signal received from the stylus via the at least one channel, and when executing the instructions, the at least one processor may be further configured to adjust, based on the signal, another threshold value for determining whether to recognize an input, received from the stylus via remaining channels among the plurality of channels, as a touch input to the display or a hovering input to the display, in response to the identification.

When executing the instructions, the at least one processor may be configured to adjust the threshold value based on the signal and another threshold value which has been adjusted based on another signal previously received from the stylus having a relative location corresponding to the relative location before the signal is received.

The electronic device may include a communication circuit operatively coupled to the at least one processor, and when executing the instructions, the at least one processor may be further configured to receive information associated with an identifier for indicating the stylus from the stylus using the communication circuit, and adjust the threshold value based on the received information and the signal.

When executing the instructions, the at least one processor may be configured to receive the signal, caused based on another signal caused from the sensor circuitry, from a coil of the stylus using the sensor circuitry via the display. The other signal may be transmitted from the sensor circuitry to the stylus via the display during a first time interval, and the signal may be received from the stylus to the sensor circuitry via the display during a second time interval subsequent to the first time interval.

When executing the instructions, the at least one processor may be configured to adjust the threshold value by applying a value determined based on the signal to another threshold value set before the signal is received, in response to the identification.

The display may be viewed via at least a part of a first side of the housing, and the sensor circuitry may be disposed below the display.

Figure 8A:
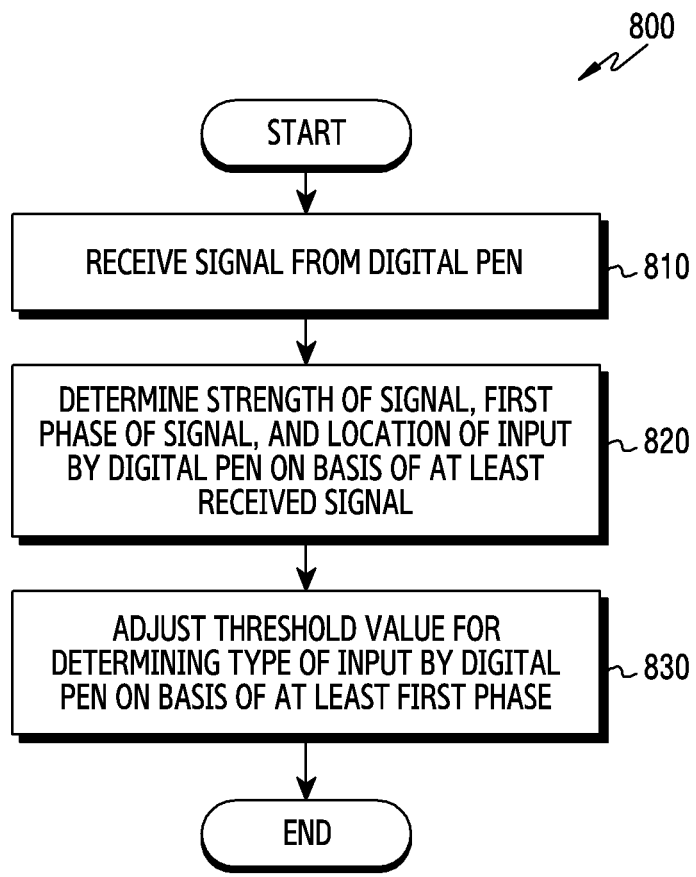
FIG. 8A illustrates an example of the operation of an electronic device according to an embodiment.

FIG. 8A illustrates an example 800 of the operation of an electronic device according to an embodiment. Referring to FIG. 8A, in operation 810, the processor 120 may receive a signal from the digital pen 210 via a display panel. The processor 120 may receive the signal from the digital pen 210 spaced apart from the display 160. The digital pen 210 may be configured to be attachable to the electronic device 101 or to be inserted in the electronic device 101.

In operation 820, the processor 120 may determine the strength of the signal, a first phase of the signal, and the location of an input by the digital pen 210 based on at least the received signal. The first phase of the signal may be obtained by analyzing the frequency of the signal. The location of an input by the digital pen 210 may indicate the location where an input is caused by the signal in the electronic device 101. The processor 120 may determine the strength, the first phase, and the input location, in order to identify whether the digital pen 210 is in a designated state.

In operation 830, the processor 120 may adjust a threshold value used for determining the type of an input by the digital pen 210 based on at least the first phase, in response to the determination. The threshold value may be configured with a phase value used for distinguishing a touch input of the digital pen 210 and a hovering input of the digital pen 210. The threshold value may be configured with a frequency value for distinguishing a touch input of the digital pen 210 and a hovering input of the digital pen 210.

The processor 120 may store, in advance, a second phase obtained based on a signal received from the digital pen 210 in the designated state before receiving the signal in operation 810. The processor 120 may compare the first phase and the second phase. When the result of the comparison shows that a difference exists between the first phase and the second phase, the processor 120 may adjust the threshold value based on the difference between the first phase and the second phase. When the result of the comparison shows that the first phase corresponds to the second phase, the processor 120 may maintain a previously adjusted threshold value. However, the disclosure is not limited thereto.

As described above, the electronic device may adaptively adjust a threshold value used for identifying the type of an input caused by a signal received from the digital pen 210, based on at least one value obtained from the signal received from the digital pen 210. Via the adjustment of a threshold value, the electronic device 101 may provide a constant sense of writing, irrespective of the type of a digital pen that causes an input in the electronic device 101, the type of the electronic device 101 that receives an input from a digital pen, or a change in the environment around the electronic device 101.

Figure 8B:
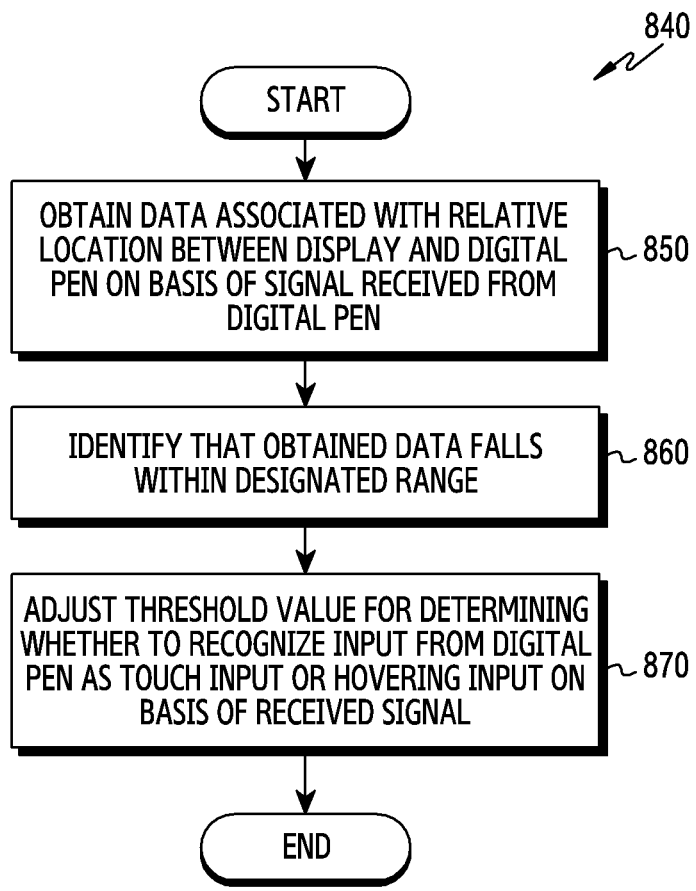
FIG. 8B illustrates another example 840 of the operation of an electronic device according to an embodiment.

FIG. 8B illustrates another example 840 of the operation of an electronic device according to an embodiment. Referring to FIG. 8B, in operation 850, the processor 120 may obtain data associated with the relative location between the display 160 and the digital pen 210 based on a signal received via the display 160 from the digital pen 210 spaced apart from the display 160. The relative location may include the relative location defined by the descriptions of FIGS. 5 to 7. The data may be configured in various formats. For example, the data may be configured with at least one of a value indicating the distance between the display 160 and the digital pen 210, or a value indicating the coordinates of a point at which a line extended from the tip of the digital pen 210 is in contact with the display 160.

In operation 860, the processor 120 may identify that the obtained data falls within a designated range, in order to identify whether the digital pen 210 is in the designated state defined by the descriptions of FIGS. 5 to 7. The processor 120 may perform operation 870 based on identifying that the obtained data falls within the designated range. For example, the processor 120 may identify whether the distance between the display 160 and the digital pen 210 falls within a designated range, and may identify whether the coordinates of a point at which a line extended from the tip of the digital pen 210 is in contact with the display 160 (or the location where the signal is received) falls within a designated area of the display 160, thereby identifying whether the obtained data falls within the designated range. The processor 120 may perform operation 870 based on identifying that the obtained data falls within the designated range.

In response to the identification, the processor 120 may adjust a threshold value, which is used for determining whether to recognize an input by the digital pen 210 as a touch input to the display 160 or a hovering input to the display 160, based on the received signal in operation 870.

The processor 120 may recognize the type of an input from the digital pen 210 using the adjusted threshold value. For example, the processor 120 may adjust the threshold value, and may receive an input from the digital pen 210. The input may be generated based on a signal received from the digital pen 210. The signal received from the digital pen 210 may be generated as a signal, such as the third electromagnetic signal defined via the descriptions of FIGS. 5 to 7, distinct from a signal that the sensor circuitry 510 receives from the digital pen 210. The processor 120 may compare the adjusted threshold value with a value indicating the phase of the generated signal.

The processor 120 may recognize the input as a hovering input based on identifying that the value is greater than or equal to the threshold value. In response to the recognition, the processor 120 may provide a function corresponding to the hovering input in the electronic device 101. Unlike the above, the processor 120 may recognize the input as a touch input based on identifying that the value is less than the threshold value. In response to the recognition, the processor 120 may provide a function corresponding to the touch input in the electronic device 101. The processor 120 may compare the adjusted threshold value with a value indicating the frequency of the generated signal, and may recognize the input as a hovering input based on identifying that the value is greater than or equal to the threshold value. In response to the recognition, the processor 120 may provide a function corresponding to the hovering input in the electronic device 101. Unlike the above, the processor 120 may recognize the input as a touch input based on identifying that the value is less than the threshold value. In response to the recognition, the processor 120 may provide a function corresponding to the touch input in the electronic device 101. However, the disclosure is not limited thereto.

As described above, the electronic device 101 may improve the sense of writing with the digital pen 210 by adjusting the threshold value based on a signal received from the digital pen 210.

Figure 9A:
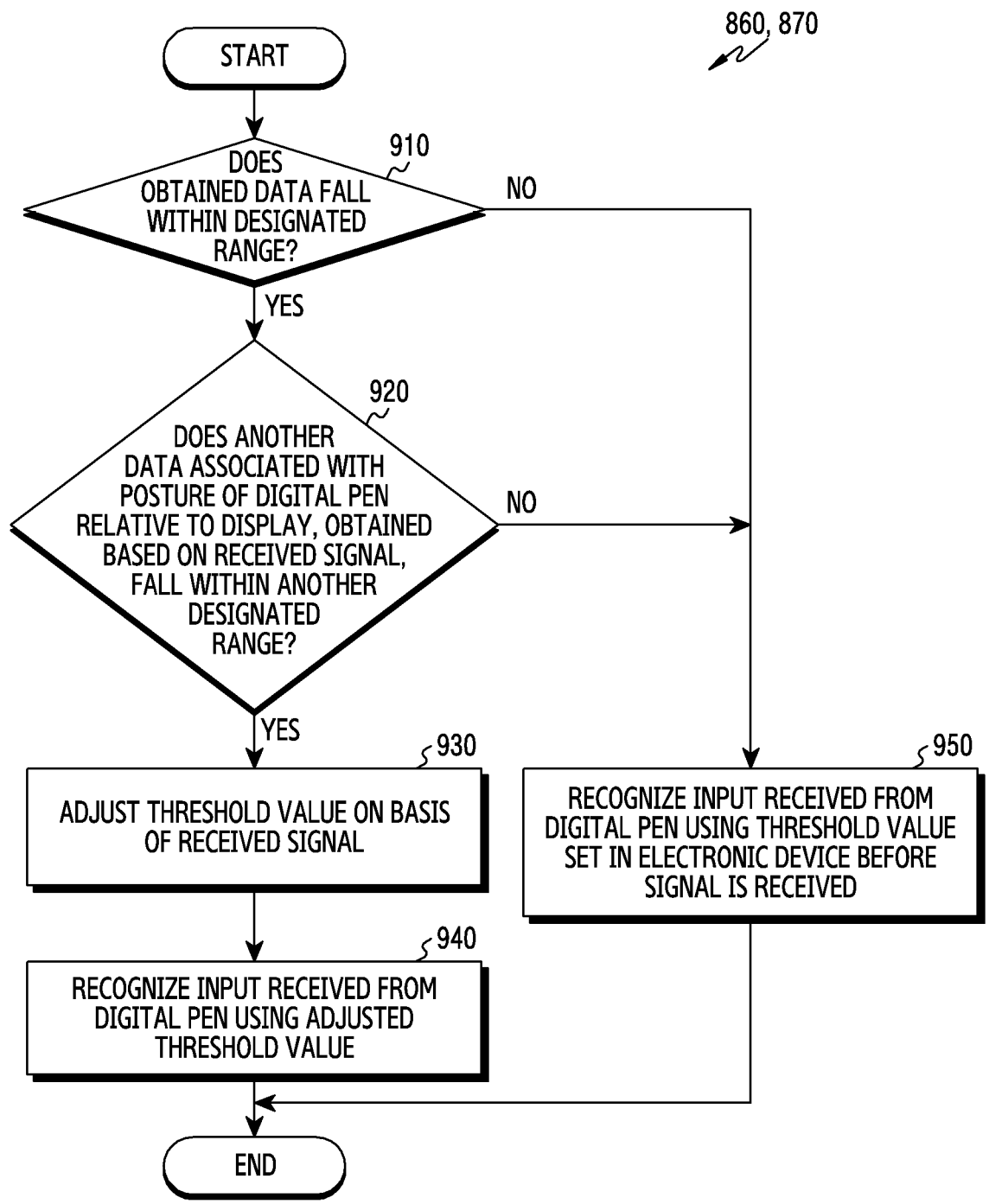
FIG. 9A illustrates an example of an operation of recognizing, by an electronic device, an input from a digital pen according to an embodiment.

FIG. 9A illustrates an example of recognizing, by an electronic device, an input from a digital pen according to an embodiment. Operations 910 to 950 of FIG. 9A may be included in operations 860 and 870 of FIG. 8B.

Referring to FIG. 9A, in operation 910, the processor 120 may identify whether data associated with the relative location between the digital pen 210 and the display 160, obtained based on a signal received from the digital pen 210, falls within a designated range. The processor 120 may perform operation 920 based on identifying that the obtained data falls within the designated range. The processor 120 may perform operation 950 based on identifying that the obtained data is beyond the designated range.

In operation 920, based on identifying that the obtained data falls within the designated range, the processor 120 may identify whether another data associated with the posture of the digital pen 210 relative to the display 160, obtained based on the signal received from the digital pen 210, falls within another designated range. The other data may indicate data associated with the posture of the digital pen 210 defined by the descriptions of FIGS. 5 to 7, such as a value indicating the angle between the digital pen 210 and the display 160. The processor 120 may perform operation 930 based on identifying that the other data falls within the other designated range, and may perform operation 950 based on identifying that the other data beyond the other designated range.

Although FIG. 9A illustrates an example of performing operation 920 after operation 910, this is merely an example for ease of description. Operation 910 and operation 920 may be performed in the electronic device 101 in parallel, or may be performed in reverse order.

In operation 930, the processor 120 may adjust the threshold value based on the signal received from the digital pen 210, i.e., based on identifying that the data falls within the designated range and the other data falls within the other designated range. For example, the processor 120 may adjust the threshold value based on the signal and another threshold value, which was adjusted based on another signal received from the digital pen 210 in the designated state before receiving the signal.

In operation 940, the processor 120 may recognize an input received from the digital pen 210 using the adjusted threshold value. For example, when a value obtained based on the input is greater than or equal to the threshold value, the processor 120 may recognize the input as a hovering input. When the value obtained based on the input is less than the threshold value, the processor 120 may recognize the input as a touch input.

In operation 950, the processor 120 may recognize an input received from a digital pen using a threshold value set in advance in the electronic device 101 before the signal is received, based on identifying that the data is beyond the designated range or the other data is beyond the other designated range. The processor 120 may bypass operation 930 of adjusting a threshold value and may recognize the input using a threshold value set in the electronic device 101 before the signal is received, based on identifying that the data is beyond the designated range or the other data is beyond the other designated range, in order to provide consistency in adjusting a threshold value.

As described above, the electronic device 101 may determine whether the state of the digital pen 210 corresponds to the state that enables adjusting the threshold value based on a signal received from the digital pen 210, may adjust the threshold value or bypass the adjustment of the threshold value depending on the result of the determination, and thus, may improve the sense of writing with the digital pen 210.

Figure 9B:
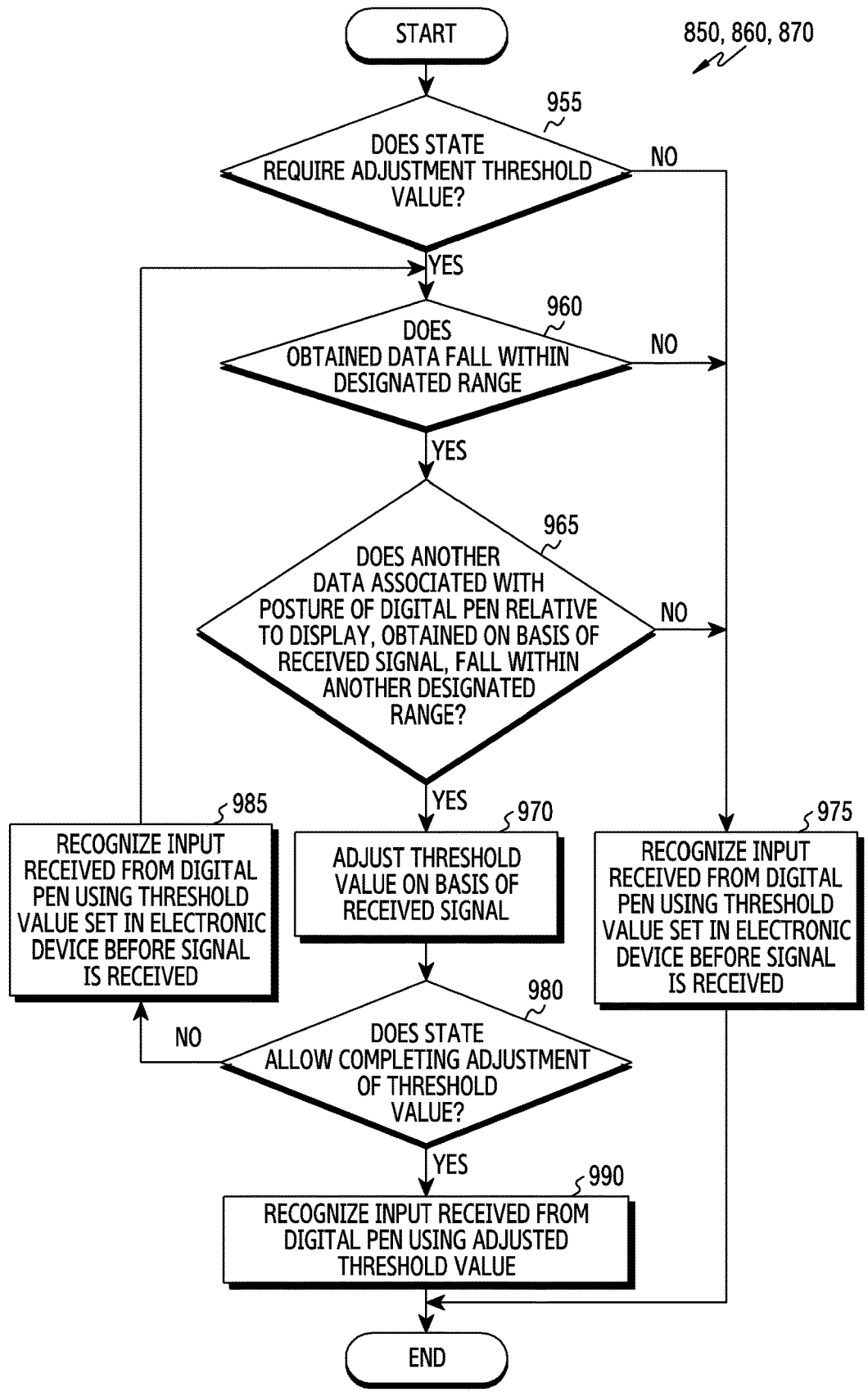
FIG. 9B illustrates another example of an operation of recognizing, by an electronic device, an input from a digital pen according to an embodiment.

FIG. 9B illustrates another example of an operation of recognizing, by an electronic device, an input from a digital pen according to an embodiment. Operations 955 to 990 of FIG. 9B may be included in operations 850 and 870 of FIG. 8B.

Referring to FIG. 9B, in operation 955, the processor 120 may identify whether the state of the electronic device 101 requires adjustment of a threshold, in response to receiving a signal from the digital pen 210, instead of adjusting a threshold value every time a signal is received from the digital pen 210. For example, the state that requires adjustment of a threshold value may indicate when the state of the display 160 is changed from an inactive state to an active state. The inactive state may include a turn-off state or a low-power state. The active state may be when steady power is provided to the display 160.

As another example, the state that requires adjustment of a threshold value may indicate when the electronic device 101 is rebooted, or when the electronic device 101 is changed from a turned-off state to a turned-on state. As another example, the state that requires adjustment of the threshold value may indicate when a signal is received from the digital pen 210 a predetermined number of times, which may be adjusted by a setting by a user. The processor 120 may perform operation 960 in response to identifying that the state of the electronic device 101 is the state that requires adjustment of a threshold value. The processor 120 may perform operation 975 in response to identifying that the state of the electronic device 101 is not the state that requires adjustment of a threshold value.

In operation 960, the processor 120 may identify whether data associated with the relative location between the digital pen 210 and the display 160, obtained based on a signal received from the digital pen 210, falls within a designated range, based on identifying that the state of the electronic device 101 is the state that requires the adjustment of a threshold value. In operation 965, based on identifying that the data falls within the designated range, the processor 120 may identify whether another data associated with the posture of the digital pen 210 relative to the display 160, obtained based on the signal received from the digital pen 210, falls within another designated range. Although FIG. 9B illustrates an example of performing operation 965 after operation 960, this is merely an example for ease of description. Operations 960 and 965 may be performed in the electronic device 101 in parallel, or may be performed in reverse order.

In operation 970, the processor 120 may adjust the threshold value based on the signal received from the digital pen 210, based on identifying that the data falls within the designated range and the other data falls within the other designated range. In operation 975, the processor 120 may recognize an input received from the digital pen 210 using a threshold value set in advance in the electronic device 101 before the signal is received, based on identifying that the state of the electronic device 101 does not require adjustment of a threshold value, identifying that the data is beyond the designated range, or identifying that the other data is beyond the other designated range. In operation 980, after the processor 120 adjusts the threshold value, the processor 120 may identify whether the current state enables completing the adjustment of the threshold value. For example, the electronic device 101 may adjust the threshold value multiple times and may complete adjusting the threshold value, in order to secure reliability of adjusting the threshold value. When the electronic device 101 is configured to adjust a threshold value N times and to determine a threshold value, the processor 120 may continuously adjust the threshold value until the threshold value is adjusted N times. When the threshold value is adjusted N-k times (k is an integer less than N and greater than 0), the processor 120 may perform operation 985. When the threshold value is adjusted N times, the processor 120 may proceed with operation 990, as described below.

In operation 985, based on identifying that it is not the state that allows completing the adjustment of the threshold value, the processor 120 may recognize an input received from the digital pen using a threshold value set in advance in the electronic device 101 before the signal is received. For example, the processor 120 may recognize an input received from the digital pen using a threshold value set in advance in the electronic device 101 before the signal is received, in order to secure reliability of adjusting the threshold value.

The processor 120 may perform operations 960 to 980 after performing operation 985, until adjustment of the threshold value is completed. When the processor 120 performs operations 960 to 970 again after initial performance of operations 960 to 970, a signal from the digital pen 210 which is used in operations 960 to 970 may be a signal of the initial performance of operations 960 to 970, or may be a signal received after the signal of the initial performance of operations 960 to 970.

In operation 990, based on identifying that it is the state that allows completing the adjustment of the threshold value, the processor 120 may recognize an input received from the digital pen 210 using the adjusted threshold value. For example, based on identifying that it is the state that allows completing the adjustment of the threshold value, the processor 120 may identify the adjusted threshold value as a determined threshold value, and may recognize the input received from the digital pen 210 using the adjusted threshold value based on the identification.

As described above, the electronic device 101 may define an event for adjusting a threshold value, may decrease consumption of power required for adjusting the threshold value, and may adjust a threshold value multiple times, thus providing reliability of adjusting the threshold value.

Figure 10A:
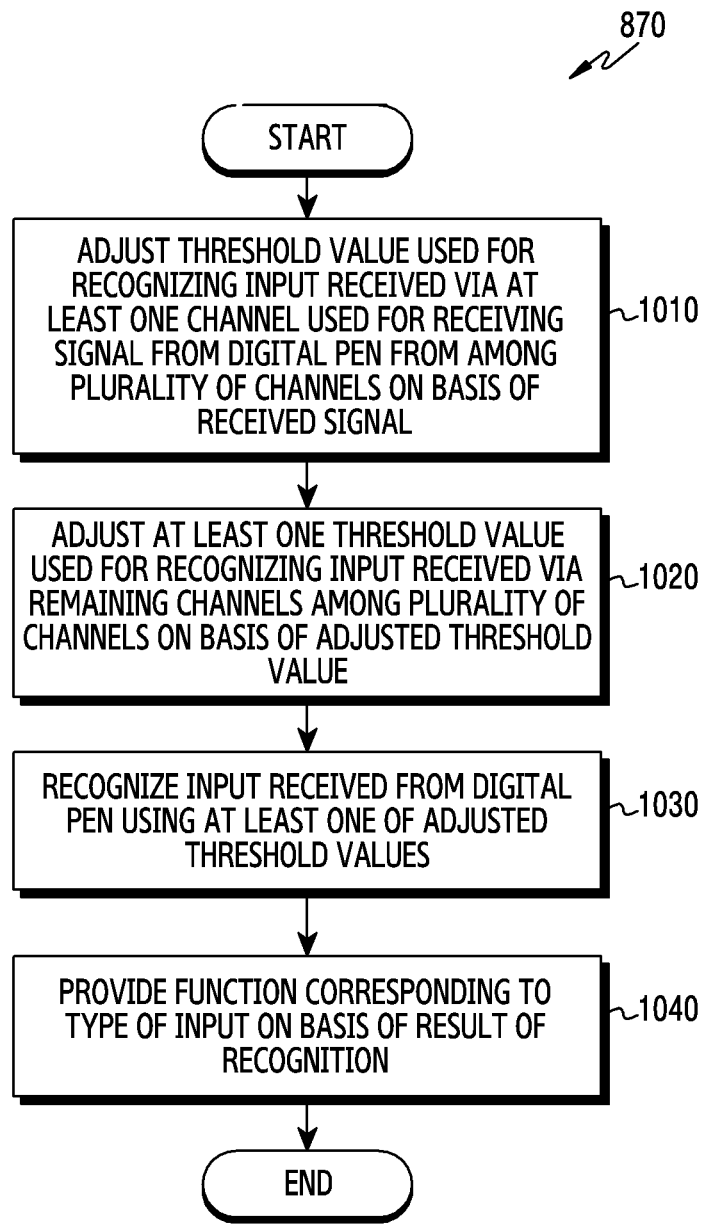
FIG. 10A illustrates an example of an operation of adjusting, by an electronic device, a threshold value to be different for each area of a display according to an embodiment.

FIG. 10A illustrates an example of an operation of adjusting, by an electronic device, a threshold value different for each area of a display according to an embodiment. Operations 1010 to 1040 of FIG. 10A may be included in operation 870 of FIG. 8B.

Figure 10B:
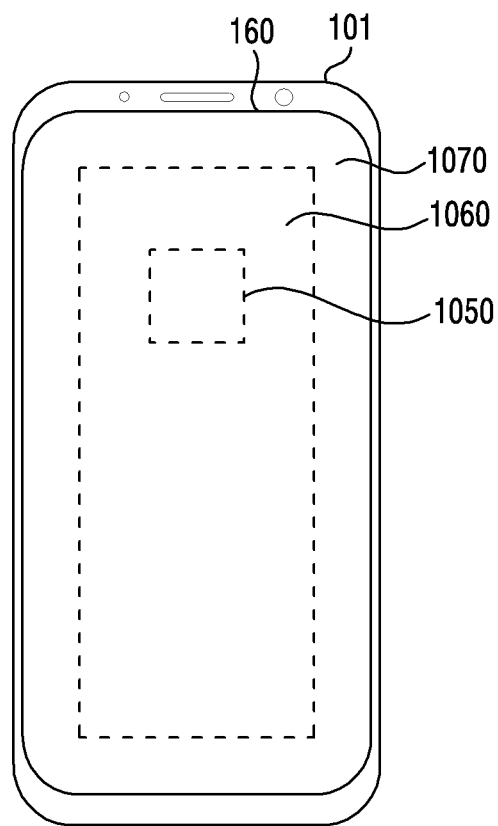
FIG. 10B illustrates an example of adjusting a threshold value to be different for each area of a display of an electronic device according to an embodiment.

FIG. 10B illustrates an example of adjusting a threshold value to be different for each area of a display of an electronic device according to an embodiment.

Referring to FIG. 10A, in operation 1010, based on a signal received from the digital pen 210, the processor 120 may adjust a threshold value, which is used for recognizing an input received via at least one channel for receiving the signal from among a plurality of channels included in the sensor circuitry 510. For example, when a threshold value for recognizing an input received via the display 160 from the digital pen 210 is set to be different for each area of the display 160, the processor 120 may differently adjust a threshold value for recognizing an input received via at least one channel used for receiving the signal, and a threshold value for recognizing an input received via the remaining channels remaining after excluding the at least one channel from among the plurality of channels. The processor 120 may limit, to an input received via the at least one channel, a range within which the threshold value adjusted in operation 1010 is applied, in order to set a threshold value for recognizing an input received via the display 160 from the digital pen 210 to be different for each area of the display 160.

In operation 1020, the processor 120 may adjust at least one threshold value used for recognizing an input received via the remaining channels among the plurality of channels based on the adjusted threshold value. For example, referring to FIG. 10B, the processor 120 may adjust, from A to B, a first threshold value for recognizing an input received via an area 1060 where the signal is received from the digital pen 210 among the entire display area of the display 160. The processor 120 may adjust a second threshold value for recognizing an input received via an area 1050 that at least overlap an area where a rear camera or the like included in the camera module 180 is disposed, from C to D based on the adjusted first threshold value (B). The processor 120 may adjust a third threshold value for recognizing an input received via an area 1070 corresponding to an edge area distinct from the area 1050 and the area 1060, from E to F based on the adjusted first threshold value (B). However, the disclosure is not limited thereto. For example, unlike FIG. 10A, the processor 120 may configure threshold values for recognizing inputs received respectively via the areas 1050, 1060, and 1070, to be different from each other, based on the received signal.

In operation 1030 the processor 120 may recognize an input received from the digital pen 210 using at least one of the adjusted threshold values. For example, when the input is received via the area 1060, the processor 120 may recognize the input using the adjusted first threshold value. When the input is received via the area 1050, the processor 120 may recognize the input using the adjusted second threshold value. When the input is received via the area 1070, the processor 120 may recognize the input using the adjusted third threshold value.

In operation 1040, the processor 120 may provide a function corresponding to the type of the input based on the result of the recognition. For example, the processor 120 may display a visual object corresponding to the type of the input via the display 160 based on the result of the recognition. However, the disclosure is not limited thereto.

As described above, the electronic device 101 may recognize an input using a threshold value, which is adjusted to be different depending on the location of the input received via the display 160 from the digital pen 210, and thus, the sense of writing with the digital pen 210 may be improved irrespective of the location where an input is received.

Figure 11:
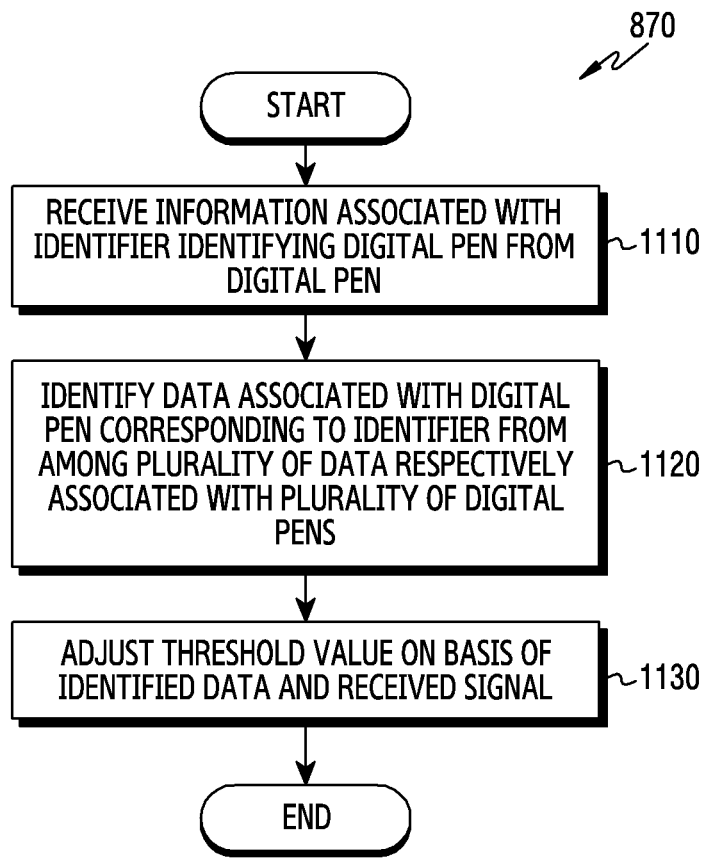
FIG. 11 illustrates an example of an operation of adjusting, by an electronic device, a threshold value based on information received from a digital pen according to an embodiment.

FIG. 11 illustrates an example of an operation of adjusting, by an electronic device, a threshold value based on information received from a digital pen according to an embodiment. Operations 1110 to 1130 of FIG. 11 may be included in operation 870 of FIG. 8B.

Referring to FIG. 11, in operation 1110, the processor 120 may receive information associated with an identifier indicating the digital pen 210, from the digital pen 210 via the communication circuit 190, such as via a BLE communication path. The identifier may be unique information for distinguishing the digital pen 210 from other digital pens, such as the MAC address or the MAC ID of the digital pen 210. The information associated with the identifier may be received in the process of establishing communication between the digital pen 210 and the electronic device 101, in response to identifying that the digital pen 210 is detachable from the electronic device 101. However, the disclosure is not limited thereto.

In operation 1120, the processor 120 may identify data associated with the digital pen 210 corresponding to the identifier from among a plurality of pieces of data respectively associated with a plurality of digital pens. For example, the processor 120 may identify the data associated with the digital pen 210 corresponding to the identifier from among the plurality of pieces of data configured as shown in Table 3.

In operation 1130, the processor 120 may adjust the threshold value based on the identified data and the received signal. The identified data may include information associated with a threshold value that was previously adjusted, and thus, the processor 120 may use the identified data as well as the received signal, in order to reliably adjust the threshold value.

As described above, the electronic device 101 may store the history of a threshold value related to each electronic pen, in order to adjust a threshold value to be different for each of the plurality of electronic pens. The electronic device 101 may provide an improved sense of writing with a digital pen by storing the same.

According to an embodiment, a method of operating an electronic device includes receiving a signal from a stylus pen via a display panel of the electronic device, determining the strength of the signal, a first phase of the signal, and the location of an input by the stylus pen based on at least the received signal, and adjusting a threshold value for determining the type of an input by the stylus pen based on at least the first phase.

The electronic device may be configured to store a second phase, and the operation of adjusting the threshold value may include comparing the first phase and the second phase, and adjusting the threshold value based on at least the result of the comparison. Adjusting the threshold value may include an operation of adjusting the threshold value based on at least the difference between the first phase and the second phase.

The threshold value may include the phase value of a signal in order to distinguish a touch input and a hovering input of the stylus pen.

The threshold value may include the frequency values of a signal in order to distinguish a touch input and a hovering input of the stylus pen.

The operation of receiving the signal may include an operation of receiving the signal from the stylus pen when the stylus pen is not in contact with the display.

According to an embodiment, a method of operating an electronic device includes obtaining data associated with the relative location between a display and a stylus based on a signal received via the display from the stylus spaced apart from the display, identifying that the data falls within a designated range, and adjusting a threshold value for determining whether to recognize the input by the stylus as a touch input to the display or a hovering input to the display, based on the signal, in response to the identification.

The method may further include obtaining another data associated with the posture of the stylus relative to the display based on the signal, and adjusting the threshold value based on the signal in response to identifying that the data falls within the designated range and the other data falls within another designated range. The data may include a value indicating the distance between the display and the stylus, and a value indicating the location where the signal is received. The other data may include a value indicating the angle between the stylus and the display.

The method may further include receiving an input from the stylus, recognizing the received input as a hovering input based on identifying that a value obtained based on the received input is greater than or equal to the adjusted threshold value, and providing a function corresponding to the hovering input; and an operation of recognizing the received input as a touch input based on identifying that a value obtained based on the received input is less than the adjusted threshold value, and providing a function corresponding to the touch input. The value obtained based on the received input may include a value indicating the phase of a signal caused in the sensor circuitry due to the input.

The sensor circuitry may include a plurality of channels, and obtaining the data may include obtaining the data associated with the relative location by determining the location where the signal is received and the distance between the display and the tip of the stylus based on the strength of the signal received via at least one channel from among the plurality of channels from the stylus. The threshold may be used for a signal received via the at least one channel from the stylus, and the method may further include an operation of adjusting another threshold value used for determining whether to recognize an input received via remaining channels among the plurality of channels from the stylus as a touch input to the display or a hovering input to the display, based on the signal in respond to the identification.

Adjusting the threshold value may include adjusting the threshold value based on the signal and another threshold value which was adjusted based on another signal that was previously received from the stylus having a relative location corresponding to the relative location before the signal is received.

The method may further include receiving information associated with an identifier for indicating the stylus from the stylus, and adjusting the threshold value based on the received information and the signal.

Receiving the signal may include an operation of receiving the signal, caused based on another signal caused from the sensor circuitry, from a coil of the stylus via the display using the sensor circuitry.

The other signal may be transmitted from the sensor circuitry to the stylus via the display during a first time interval, and the signal may be received by the sensor circuitry from the stylus via the display during a second time interval subsequent to the first time interval.

Adjusting the threshold value may include an operation of adjusting the threshold value by applying a value determined based on the signal to another threshold value set in advance before the signal is received, in response to the identification.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the disclosure The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. A plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. A separate storage device on the communication network may access a portable electronic device.

As used herein, the term "module" may include a unit implemented in hardware, software, or firmware, and may interchangeably be used with other terms, such as "logic," "logic block," "part," or "circuitry". A module may be a single integral component, or a minimum unit or part thereof, adapted to perform one or more functions, and may be implemented in a form of an application-specific integrated circuit (ASIC).

Embodiments as set forth herein may be implemented as software including one or more instructions that are stored in a storage medium that is readable by a machine. For example, a processor of the machine may invoke and execute at least one of the one or more instructions stored in the storage medium, with or without using one or more other components under the control of the processor. This enables the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" indicates that the storage medium is a tangible device, and does not include a signal, but this term does not differentiate between where data is semi-permanently stored in the storage medium and where the data is temporarily stored in the storage medium.

A method according to an embodiment may be included and provided in a computer program product, which may be traded as a product between a seller and a buyer and may be distributed in the form of a machine-readable storage medium, such as compact disc read only memory (CD-ROM), or be downloaded or uploaded online via an application store, such as PlayStore™, or between two user devices directly. If distributed online, at least part of the computer program product may be temporarily generated or at least temporarily stored in the machine-readable storage medium, such as memory of the manufacturer's server, a server of the application store, or a relay server.

Each component of the above-described components may include a single entity or multiple entities. One or more of the above-described components may be omitted, or one or more other components may be added. Alternatively or additionally, a plurality of components may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, or one or more of the operations may be executed in a different order or omitted, or one or more other operations may be added.

A component included in the disclosure is expressed in the singular or the plural according to the embodiment. However, the singular form or plural form is selected for convenience of description suitable for the presented situation, and embodiments of the disclosure are not limited to a single element or multiple elements thereof. Multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure as defined by the appended claims and their equivalents.

What is claimed is:

1. An electronic device, comprising:
a housing;
a display panel which is viewable via a part of the housing, and is configured to detect an input by a stylus pen;
a memory storing instructions; and
a processor operatively connected to the display panel and the memory, and is configured to execute the stored instructions to:
receive a signal from the stylus pen via the display panel;
identify a strength of the signal, a first phase of the signal, and a location of an input by the stylus pen based on at least the received signal; and
adjust a threshold value used for determining a type of an input by the stylus pen based on at least the first phase,
wherein the threshold value comprises a phase value of a signal to be used for distinguishing a touch input and a hovering input by the stylus pen.

2. The electronic device of claim 1,
wherein the memory is further configured to store a second phase, and
wherein the instructions further cause the processor to:
compare the first phase to the second phase; and
adjust the threshold value based on at least a result of the comparison.

3. The electronic device of claim 2, wherein the instructions further cause the processor to adjust the threshold value based on at least a difference between the first phase and the second phase.

4. The electronic device of claim 1,
wherein the threshold value comprises frequency values of a signal to be used for distinguishing a touch input and a hovering input by the stylus pen.

5. The electronic device of claim 1,
wherein the instructions further cause the processor to receive the signal from the stylus pen when the stylus pen is not in physical contact with the display.

6. The electronic device of claim 1,
wherein the housing further comprises a hole capable of receiving the stylus pen.

7. An electronic device, comprising:
a display;
a sensor circuitry;
at least one memory storing instructions; and
at least one processor operatively coupled to the display, the sensor circuitry, and the at least one memory,
wherein, when executing the instructions, the at least one processor is configured to:
obtain data associated with a relative location between the display and a stylus based on a signal received via the display from the stylus spaced apart from the display;
identify that the data falls within a designated range;
adjust a threshold value for determining whether to recognize an input by the stylus as a touch input to the display or a hovering input to the display based on the signal, in response to the identifying; and
adjust the threshold value by applying a value determined based on the signal to another threshold value set before the signal is received, in response to the identification.

8. The electronic device of claim 7,
wherein, when executing the instructions, the at least one processor is further configured to:
obtain other data associated with a posture of the stylus relative to the display based on the signal, the other data being different than the obtained data; and
adjust the threshold value based on the signal in response to identifying that the data falls within the designated range, and that the other data falls within another designated range.

9. The electronic device of claim 8,
wherein the data comprises a value indicating a distance between the display and the stylus, and a value indicating a location where the signal is received, and
wherein the other data comprises a value indicating an angle between the stylus and the display.

10. The electronic device of claim 7,
wherein, when executing the instructions, the at least one processor is further configured to:
receive an input from the stylus;
recognize the received input as a hovering input and provide a function corresponding to the hovering input based on identifying that a value obtained based on the received input is greater than or equal to the adjusted threshold value; and
recognize the received input as a touch input and provide a function corresponding to the touch input based on identifying that a value obtained based on the received input is less than the adjusted threshold value.

11. The electronic device of claim 10,
wherein the value obtained based on the received input comprises a value indicating a phase of a signal caused in the sensor circuitry due to the input.

12. The electronic device of claim 7, wherein the sensor circuitry comprises:
a plurality of channels; and
wherein, when executing the instructions, the at least one processor is further configured to: determine a distance between the display and a tip of the stylus and a location where the signal is received, based on a strength of the signal received from the stylus via each of at least one channel among the plurality of channels, so as to obtain the data associated with the relative location.

13. The electronic device of claim 12, wherein the threshold value is used for a signal received from the stylus via the at least one channel, and wherein, when executing the instructions, the at least one processor is further configured to adjust, based on the signal, another threshold value for determining whether to recognize an input, received from the stylus via remaining channels other than the at least one channel, as a touch input to the display or a hovering input to the display, in response to the identification.

14. The electronic device of claim 7, wherein, when executing the instructions, the at least one processor is configured to: adjust the threshold value based on the signal and another threshold value which has been adjusted based on another signal previously received from the stylus having a relative location corresponding to the relative location before the signal is received.

15. The electronic device of claim 7, further comprising:

a communication circuit operatively coupled to the at least one processor, and wherein, when executing the instructions, the at least one processor is further configured to:

receive information associated with an identifier for indicating the stylus from the stylus using the communication circuit; and adjust the threshold value based on the received information and the signal.

16. The electronic device of claim 7, wherein, when executing the instructions, the at least one processor is configured to: receive the signal, based on another signal caused from the sensor circuitry, from a coil of the stylus using the sensor circuitry via the display.

17. The electronic device of claim 16, wherein the other signal is transmitted from the sensor circuitry to the stylus via the display during a first time interval, and the signal is received from the stylus to the sensor circuitry via the display during a second time interval subsequent to the first time interval.

18. The electronic device of claim 7, wherein the display is viewed via at least a part of a first side of the housing, and wherein the sensor circuitry is disposed below the display.

* * * * *